(12) United States Patent
Ito

(10) Patent No.: US 10,247,954 B2
(45) Date of Patent: Apr. 2, 2019

(54) STAGE APPARATUS HAVING SHAKE-CORRECTION FUNCTION

(71) Applicant: RICOH IMAGING COMPANY, LTD., Tokyo (JP)

(72) Inventor: Eiichi Ito, Chiba (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 86 days.

(21) Appl. No.: 15/435,352

(22) Filed: Feb. 17, 2017

(65) Prior Publication Data

US 2017/0285361 A1  Oct. 5, 2017

(30) Foreign Application Priority Data

Mar. 29, 2016  (JP) .................................. 2016-065916
Feb. 14, 2017  (JP) .................................. 2017-024755

(51) Int. Cl.
*G02B 27/64* (2006.01)
*H02K 41/02* (2006.01)

(52) U.S. Cl.
CPC .......... *G02B 27/646* (2013.01); *H02K 41/02* (2013.01); *H02K 2201/18* (2013.01)

(58) Field of Classification Search
CPC ........ G02B 7/04; G02B 27/64; G02B 27/646; H04N 5/23248; H04N 5/23264; H04N 5/2328; H04N 5/23287

USPC .............. 359/554, 555, 556, 557; 250/201.1, 250/201.2, 201.4; 348/208.99, 208.2, 348/208.12; 396/52, 55
See application file for complete search history.

(56) References Cited

U.S. PATENT DOCUMENTS

| | | | |
|---|---|---|---|
| 9,625,734 B2* | 4/2017 | Dobermann | F16F 15/035 |
| 9,638,929 B2* | 5/2017 | Terajima | G02B 27/646 |
| 2006/0064884 A1 | 3/2006 | Seo | |
| 2007/0058076 A1 | 3/2007 | Seo | |
| 2011/0279899 A1 | 11/2011 | Motoike et al. | |

FOREIGN PATENT DOCUMENTS

| | | |
|---|---|---|
| JP | 2006-94185 | 4/2006 |
| JP | 2007-72089 | 3/2007 |
| JP | 2013-50499 | 3/2013 |
| JP | 5308457 | 10/2013 |

* cited by examiner

*Primary Examiner* — Arnel C Lavarias
(74) *Attorney, Agent, or Firm* — Greenblum & Bernstein, P.L.C.

(57) ABSTRACT

A stage apparatus includes a movable member configured to move in a direction parallel to a predetermined plane, a base member configured to support the movable member to move relative to the base member, and a thrust generator including: a magnet provided on one of the movable member and the base member, and a coil provided on the other of the movable member and the base member. The magnet and the coil generating a thrust to move the movable member in a direction parallel to the predetermined plane. A magnetic flux density of the magnet toward the coil changes along the thrust direction.

19 Claims, 12 Drawing Sheets

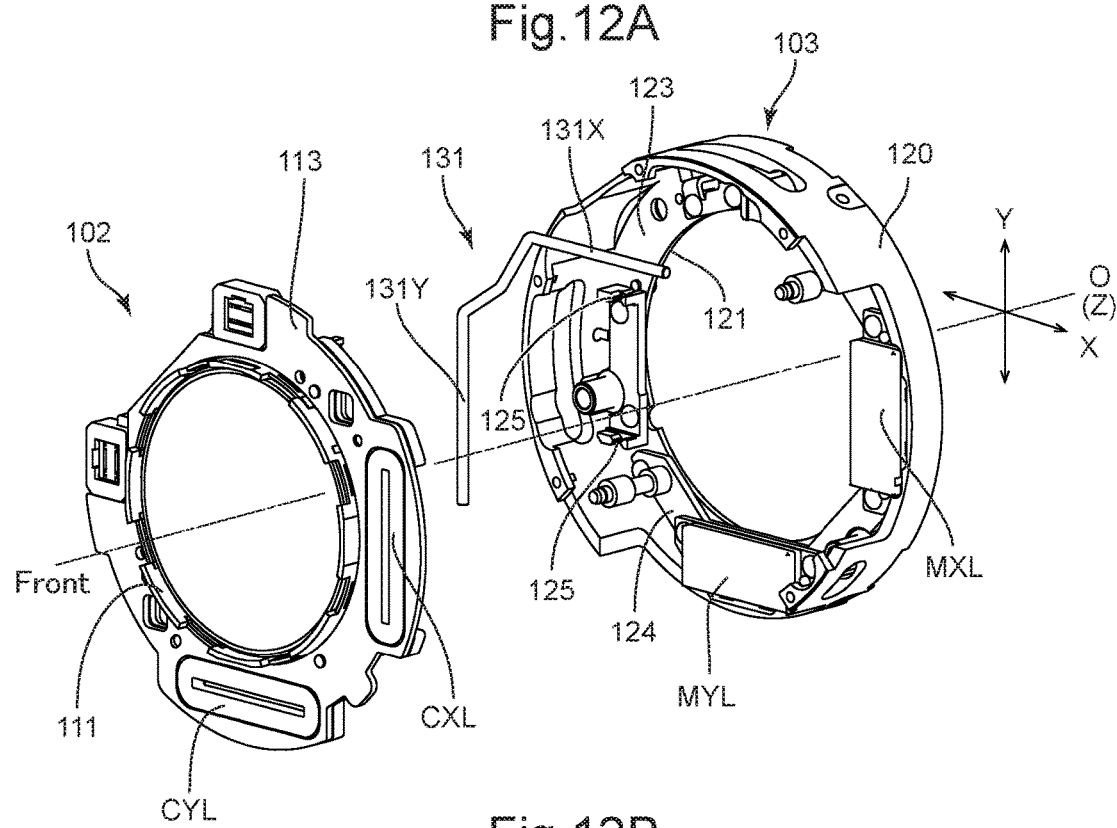
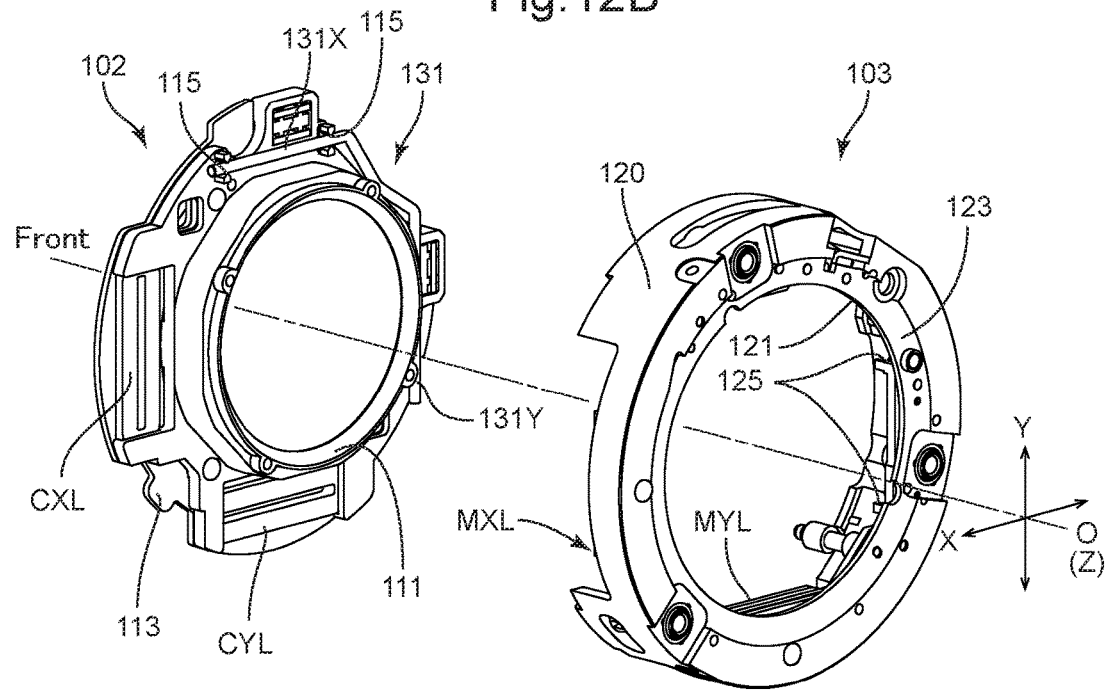

STAGE APPARATUS HAVING SHAKE-CORRECTION FUNCTION

BACKGROUND OF THE INVENTION

1. Field of the Invention

The present invention relates to a stage apparatus, and in particular, relates to a stage apparatus which can drive a movable member within a specified plane.

2. Description of the Related Art

A hand-shake correction apparatus for carrying out hand-shake correction in a single-lens reflex (SLR) camera is known in the related art, in which an image sensor is moved in directions orthogonal to the optical axis by a voice coil motor (thrust generator) that uses oblong shaped drive coils (Patent Literature 1, 2, 3 and 4).

[Patent Literature 1] Japanese Unexamined Patent Publication No. 2006-94185

[Patent Literature 2] Japanese Unexamined Patent Publication No. 2007-72089

[Patent Literature 3] Japanese Patent No. 5,308,457

[Patent Literature 4] Japanese Unexamined Patent Publication No. 2013-050499

In a hand-shake correction device of the related art, an image sensor is mounted onto a movable unit, which is driven to move within a plane (X-Y plane) that is orthogonal to the optical axis. However, when the movable unit is driven in the X-direction and the Y-direction within the X-Y plane, sometimes driving noise occurs, the movable unit tilts relative to the X-Y plane, the imaging plane tilts when the movable unit moves in the orthogonal direction, and focusing error occurs.

As a result of diligent research, the inventors of the present invention discovered that in a hand-shake correction device of the related art, when the movable unit is driven in the X-direction and/or in the Y-direction, a thrust force is not only generated in the X-direction and/or the Y-direction, but also a component force in a direction other than the X-Y plane (i.e., the Z-direction, in a direction parallel to the optical axis), and also this component force fluctuates depending on the position of the movable unit. Furthermore, such a component force in a direction other than the X-Y plane, and the fluctuation thereof, have been pinpointed as a cause of noise, imaging-plane tilt and focusing error that occur during a hand-shake correction operation.

SUMMARY OF THE INVENTION

The present invention has been devised in view of the above described problems, and the present invention provides a stage apparatus which includes a thrust generator which moves a movable member within a plane, and suppresses occurrence of thrust in a direction that is not parallel to such a plane.

According to an aspect of the present invention, a stage apparatus is provided, including a movable member configured to move in a direction parallel to a predetermined plane; a base member configured to support the movable member to move relative to the base member; and a thrust generator including: a magnet provided on one the movable member and the base member, and a coil provided on the other of the movable member and the base member. The magnet and the coil generating a thrust to move the movable member in a direction parallel to the predetermined plane. A magnetic flux density of the magnet toward the coil changes along the thrust direction.

It is desirable for the movable member and the base member to each be single members, wherein the magnet is provided on one of the movable member and the base member, and the coil is provided on the other of the movable member and the base member at a position facing the magnet.

It is desirable for a pair of the base members to be provided which face each other, at either side of the movable member, in a direction that is orthogonal to the predetermined plane. The magnets are respectively provided on the pair of the base members at positions, at either side of the movable member, so that the magnets face each other. The coil is provided on the movable member in between the magnets that face each other.

It is desirable for the magnet to have a recessed cross-sectional shape so that a thickness thereof in a direction that is orthogonal to the predetermined plane is relatively thick at either end of the magnet, with respect to the thrust direction, and a thickness thereof in the direction that is orthogonal to the predetermined plane is relatively thin at a central portion of the magnet, with respect to the thrust direction.

It is desirable for a depth of a recess of the recessed cross-sectional shape of the magnet to be 3/5 through 4/5 of the overall thickness of the magnet in the direction that is orthogonal to the predetermined plane.

It is desirable for a magnetic flux density ratio or a magnetizing force ratio at the central portion of the magnet to be 15% through 30% less than that at either end of the magnet with respect to the thrust direction.

It is desirable for each of the magnets to have a recessed cross-sectional shape so that a thickness thereof in a direction that is orthogonal to the predetermined plane is relatively thick at either end of the magnet, with respect to the thrust direction, and a thickness thereof in the direction that is orthogonal to the predetermined plane is relatively thin at a central portion of the magnet, with respect to the thrust direction. A depth of a recess of the recessed cross-sectional shape of the magnet is 1/4 through 1/2 of the overall thickness of the magnet in the direction that is orthogonal to the predetermined plane.

It is desirable for a magnetic flux density ratio or a magnetizing force ratio at the central portion of the magnet to be 20% through 50% less than that at either end of the magnet with respect to the thrust direction.

A magnetizing force of the magnet can be distributed in a concave form so that the magnetizing force is higher at either end of the magnet than the central portion of the magnet, with respect to the thrust direction.

Alternatively, a magnetizing force of the magnet can be distributed in a substantial trapezoidal form so that the magnetizing force is higher at either end of the magnet than the central portion of the magnet, with respect to the thrust direction.

Alternatively, a magnetizing force of the magnet can be distributed in a substantial rectangular form so that the magnetizing force is higher at either end of the magnet than the central portion of the magnet, with respect to the thrust direction.

It is desirable for the magnet to include a non-magnetic material in a central portion thereof, with respect to the trust direction, and a pair of magnets on either side of the non-magnetic material.

It is desirable for an image sensor to be provided on the movable member.

It is desirable for an optical member to be provided on the movable member, the optical member constituting part of a photographing optical system.

In an embodiment, a photographing apparatus is provided with the above-described stage apparatus, wherein an image sensor is provided on the movable member of the stage apparatus.

In an embodiment, an optical instrument is provided with the above-described stage apparatus, wherein an optical member is provided on the movable member of the stage apparatus, the optical member constituting part of a photographing optical system.

In an embodiment, a stage apparatus for an image projector apparatus is provided, including a movable member configured to move in a direction parallel to a predetermined plane, the movable member provided with one of an image-forming element which forms an image and a projector optical system that is configured to project an image formed by an image-forming element, a base member configured to support the movable member to move relative to the base member, and a thrust generator including a magnet provided on one the movable member and the base member, and a coil provided on the other of the movable member and the base member. The magnet and the coil generating a thrust to move the movable member in a direction parallel to the predetermined plane. A magnetic flux density of the magnet toward the coil changes along the thrust direction.

According to the stage apparatus of the present invention, when a movable member is driven within a specified plane, a component force in a direction other than the specified plane can be substantially suppressed regardless of the position of the movable member on the specified plane.

The present disclosure relates to subject matter contained in Japanese Patent Application No. 2016-065916 (filed on Mar. 29, 2016) and Japanese Patent Application No. 2017-024755 (filed on Feb. 14, 2017) which are expressly incorporated herein by reference in their entireties.

BRIEF DESCRIPTION OF THE DRAWINGS

The present invention will be described below in detail with reference to the accompanying drawings in which:

FIGS. 12A and 12B are exploded rear and front perspective views of an embodiment of the stage apparatus, of the present invention, applied to a correction optical system;

DESCRIPTION OF THE EMBODIMENTS

Figure 1:
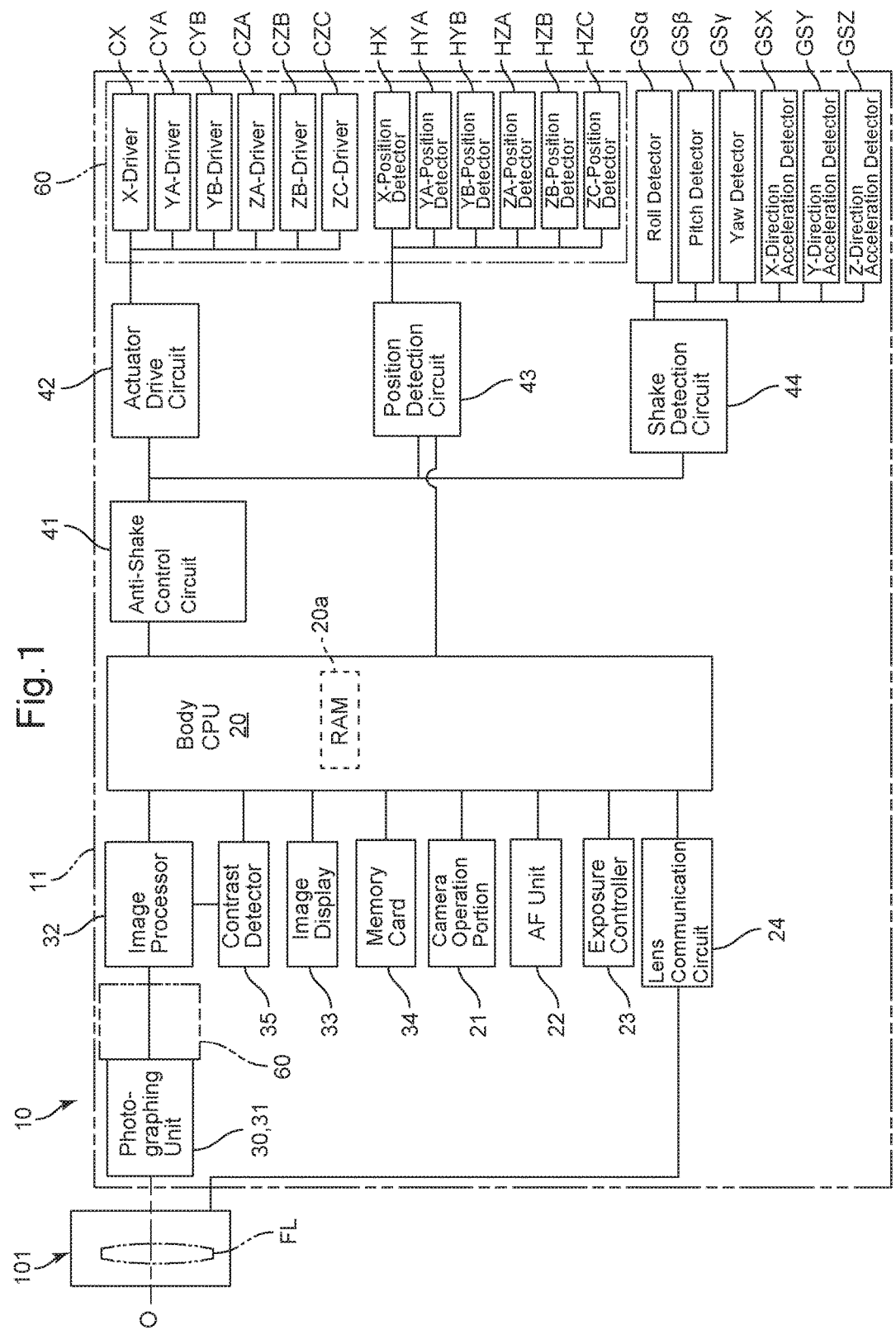
FIG. 1 is a block diagram illustrating main components of a digital camera which incorporates a stage apparatus according to the present invention is applied.

Embodiments of the present invention will be hereinafter discussed with reference to FIGS. 1 through 14. FIG. 1 is a conceptual block diagram of main components and main circuit elements of a digital camera, to which a stage apparatus of the present invention is applied. In the diagram of FIG. 1, the direction parallel to a photographing optical axis O (which includes the concept of the direction aligned with the photographing optical axis O) is defined as the first direction (Z-direction/Z-axis), a direction orthogonal to the first direction is defined as the second direction (X-direction/X-axis direction), and a direction orthogonal to both the first direction (Z-direction) and the second direction (X-direction) is defined as the third direction (Y-direction/Y-axis direction). When the photographing optical axis O is defined as the Z-axis, two axes orthogonal to the Z-axis are regarded as the X-axis and the Y-axis. When the camera is in a normal position (horizontal position), the first direction (Z-direction/Z-axis) and the second direction (X-direction/X-axis) are defined as horizontal directions and the third direction (Y-direction/Y-axis) is defined as a vertical direction, and the object side and the direction toward the object defines a front side (of the imaging apparatus) and the forward direction, respectively. Furthermore, in the present disclosure, rotation about the Z-direction (first direction) refers to rotation about an imaginary axis that is parallel to the Z-axis. Similarly, rotation about the X-direction (second direction) refers to rotation about an imaginary axis that is parallel to the X-axis, and rotation about the Y-direction (third direction) refers to rotation about an imaginary axis that is parallel to the Y-axis. Additionally, in the present specification, turning (rotation) about an imaginary axis in the first direction denotes turning with an imaginary axis parallel to (extending in) the first direction as a rotational center, tilting (rotation)

about an imaginary axis in the second direction denotes tilting with an imaginary axis parallel to (extending in) the second direction as a rotational center, and tilting (rotation) about an imaginary axis in the third direction denotes tilting with an imaginary axis parallel to (extending in) the third direction as a rotational center.

The digital camera 10 is provided with a camera body 11 and a photographic lens 101 as a photographing optical system. The digital camera 10 is provided in the camera body 11 with a body CPU 20 and an imaging unit 30. The body CPU 20 controls the overall operations of the camera, performs computational and arithmetic operations, and controls driving of the camera 10. The imaging unit 30 is provided with an image sensor (image pickup device) 31 which captures an object image made incident thereon via the photographic lens 101. The body CPU 20 controls driving of the image sensor 31, processes image signals of captured object images at an image processor 32 to display the captured object images on an image display (monitor) 33, and writes data of the captured object images onto a memory card 34.

The digital camera 10 is provided with a contrast detector 35, a camera input device (a camera operation portion) 21, an AF Unit 22, an exposure controller 23 and a lens communication circuit 24. The contrast detector 35 detects the contrast of an object image from the image signal processed by the image processor 32. The camera input device 21 includes, e.g., control switches, buttons, a dial(s) and/or a touchscreen, which are manually operated by the user to operate all the functions of the camera. The AF Unit 22 drives a focusing optical system (not shown), contained in the photographic lens 101, in the optical axis direction (the direction along the optical axis O) to adjust the focus. The exposure controller 23 controls opening and closing operations of a diaphragm, a shutter, etc., to adjust the quantity of light incident on the image sensor 31 and drives the image sensor 31 to control imaging operations. The lens communication circuit 24 performs communications with the photographic lens 101 to input lens information such as the focal length f, etc., of the photographic lens 101.

The digital camera 10 is provided with a roll detector GSα (which detects turning (rotation) about an imaginary axis in the Z-direction), a pitch detector Gsβ (which detects tilt (rotation) about an imaginary axis in the X-direction), a yaw detector GSγ (which detects tilt (rotation) about an imaginary axis in the Y-direction), an X-direction acceleration detector GSX, a Y-direction acceleration detector GSY and a Z-direction acceleration detector GSZ as detectors for detecting shaking (vibrations) of the camera body 11 that is caused by hand shake; each of these six detectors are connected to a camera shake detecting circuit 44. These six detectors can be provided as a combined sensor, e.g., a six-axis sensor, a triple-axis gyro sensor, or a triple-axis acceleration sensor.

The imaging unit 30 is provided with a stage apparatus 60. The stage apparatus 60 is provided with a movable stage 61, a front fixed yoke 62 and a rear fixed yoke 63. The image sensor 31 is fixedly mounted to the movable stage 61, and the front fixed yoke 62 and the rear fixed yoke 63 are positioned in front of and behind the movable stage 61, respectively. The stage apparatus 60 levitationally supports the movable stage 61 (so that the movable stage 61 is magnetically levitated) relative to the front fixed yoke 62 and the rear fixed yoke 63 at least when energized. The image sensor 31 constitutes a low-profile driven member having a flat front surface. In a levitational state, the movable stage 61 of the stage apparatus 60 can translate (linearly move) in the Z-direction (the first direction), translate in the X-direction (second direction) which is orthogonal to the Z-direction, translate in the Y-direction (third direction) which is orthogonal to both the X-direction and the Z-direction, tilt (rotate) about the X-direction (second direction), tilt (rotate) about the Y-direction (third direction), and turn (rotate) about the Z-direction (first direction) to thereby exhibit six axes of motion/motion with six degrees of freedom (6DoF) (see FIGS. 2 through 5). Accordingly, the movable stage 61 of the stage apparatus 60 can translate, rotate, translate while rotating, translate after rotating, rotate after translating, and/or perform a combination of such translating and rotating operations. In the present disclosure, the term "translate" refers to moving along at least one of the X-direction, Y-direction and Z-direction without changing either the orientation or angular displacement of the image plane, corresponding to the light-receiving surface of the image sensor 31 provided on the movable stage, relative to the camera body 11, the term "tilt" refers to rotating about at least one of the X-direction and Y-direction to change the orientation of the image plane relative to the camera body 11, and the term "turn" refers to rotating about the Z-direction so that the image plane rotates about the optical axis O. In addition, the term "levitation" includes the concept of holding the movable stage 61 between the front fixed yoke 62 and the rear fixed yoke 63 in a noncontact state with the front fixed yoke 62 and the rear fixed yoke 63 and the concept of holding the movable stage 61 between the front fixed yoke 62 and the rear fixed yoke 63 in a noncontact state with the front fixed yoke 62 and the rear fixed yoke 63 at a center position (imaging initial position) where the center of the image sensor 31 is coincident with the optical axis O (the Z-axis).

The body CPU 20 inputs information on the focal length f from the photographic lens 101 via, e.g., the lens communication circuit 24, calculates the vibration direction, the vibration speed, etc., of the digital camera 10 based on detection signals input from the pitch (tilt (rotation) about an imaginary axis in the X-direction) detector Gsβ, the yaw (tilt (rotation) about an imaginary axis in the Y-direction) detector GSγ, the roll (turn (rotation) about an imaginary axis in the Z-direction) detector GSα, the X-direction acceleration detector GSX, the Y-direction acceleration detector GSY and the Z-direction acceleration detector GSZ, calculates the driving direction, the driving speed and the driving amount of the image sensor 31 so that the object image projected onto the image sensor 31 via the photographic lens 101 does not move relative to the image sensor 31 and drives the movable stage 61 of the stage apparatus 60 in with six degrees of freedom (6DoF) (six-axis motion), i.e., translate (shift) the movable member in the X-direction, the Y-direction and/or the Z-direction, tilt (rotate) the movable member about the X-direction and/or the Y-axis, and/or turn (rotate) the movable member about the Z-direction, based on the calculation results. For example, the movable stage 61 can translate (shift), rotate (tilt or turn), translate (shift) while rotating, translate (shift) after rotating, and rotating after translation (shifting). The order of these movements is optional.

The stage apparatus 60 functions as a supporter which supports the movable stage 61, to which the image sensor 31 is fixed, in a manner to allow the movable stage 61 to translate and rotate (tilt or turn) with six degrees of freedom (6DoF) with respect to the front fixed yoke 62 and the rear fixed yoke 63. The movable stage 61 is a rectangular plate (frame) and greater in size than the image sensor 31 as viewed from the front. The front fixed yoke 62 and the rear fixed yoke 63 are rectangular plates (frames) of the same size and have slightly greater outer dimensions than those of the movable stage 61 in a plan view. The front fixed yoke 62 and the rear fixed yoke 63 are provided at the centers thereof with rectangular openings 62a and 63a, respectively, which have greater dimensions than the outer dimensions of the image sensor 31 as viewed from front (as viewed in the Z-direction). The front fixed yoke 62 and the rear fixed yoke 63 are connected and held in parallel with each other with a predetermined distance therebetween via a plurality of connecting columns (not shown) at positions not interfering with the movable stage 61 even when the movable stage 61 is moved (translated, tilted or turned) within a predetermined range.

The stage apparatus 60 is provided with a left pair of X-direction magnets (second-direction magnets/left and right X-direction magnets) MX and a right pair of X-direction magnets (second-direction magnets/left and right X-direction magnets) MX, each pair being made of two permanent magnets identical in specification. The left pair of X-direction magnets MX and the right pair of X-direction magnets MX are fixed to the rear of the front fixed yoke 62 (the opposite side of the front fixed yoke 62 from the object side) to be positioned on either side of the opening 62a with respect to the leftward and rightward directions (on either side of the Z-axis with the Y-axis as a center line). Although the stage apparatus 60 is provided with the two pairs of X-direction magnets MX on either side of the opening 62a in the X-direction in the present embodiment of the stage apparatus, it is possible for the two pairs of X-direction magnets MX to be provided only on one side of the opening 62a with respect to the X-direction. Each X-direction magnet MX is a plate-like magnet which is elongated in the Y-direction and thin in the Z-direction. The left and right X-direction magnets MX of each pair are arranged parallel to the Y-axis and spaced from each other in the X-direction. In each pair of X-direction magnets MX, the front and the rear sides of one X-direction magnet MX (the left X-direction magnet MX with respect to FIG. 2B) are the north pole and the south pole, respectively, while the front and the rear sides of the other X-direction magnet MX (the right X-direction magnet MX with respect to FIG. 2B) are the south pole and the north pole, respectively. With the passage of magnetic flux of each pair of X-direction magnets MX through the front fixed yoke 62 and the rear fixed yoke 63, a portion of a magnetic circuit which generates thrust in the X-direction (the second direction) is formed between each pair of X-direction magnets MX and the rear fixed yoke 63.

The stage apparatus 60 is provided with a left pair of Y-direction magnets (upper and lower Y-direction magnets) MYA and a right pair of Y-direction magnets (upper and lower Y-direction magnets) MYB, each pair being made of two permanent magnets identical in specification. The left pair of Y-direction magnets MYA and the right pair of Y-direction magnets MYB are fixed to the rear of the front fixed yoke 62 to be positioned below the opening 62a (to be spaced downward from the Z-axis with the Y-axis as a center line). Each Y-direction magnet MYA and MYB is a plate-like magnet which is elongated in the X-direction and thin in the Z-direction. The upper and lower Y-direction magnets MYA are arranged parallel to the X-axis and spaced from each other in the Y-direction and the upper and lower Y-direction magnets MYB1 are arranged parallel to the X-axis and spaced from each other in the Y-direction. Likewise, the upper and lower Y-direction magnets MYA are arranged parallel to the X-axis and spaced from each other in the Y-direction. In each pair of Y-direction magnets MYA and MYB (the upper Y-direction magnet MYA and MYB with respect to FIG. 2A) are the south pole and the north pole, respectively. With the passage of magnetic flux of each pair of Y-direction magnets MYA and MYB through the front fixed yoke 62 and the rear fixed yoke 63, a portion of a magnetic circuit which generates thrust in the Y-direction (the third direction) is formed between each pair of Y-direction magnets MYA and MYB.

Figure 2A:
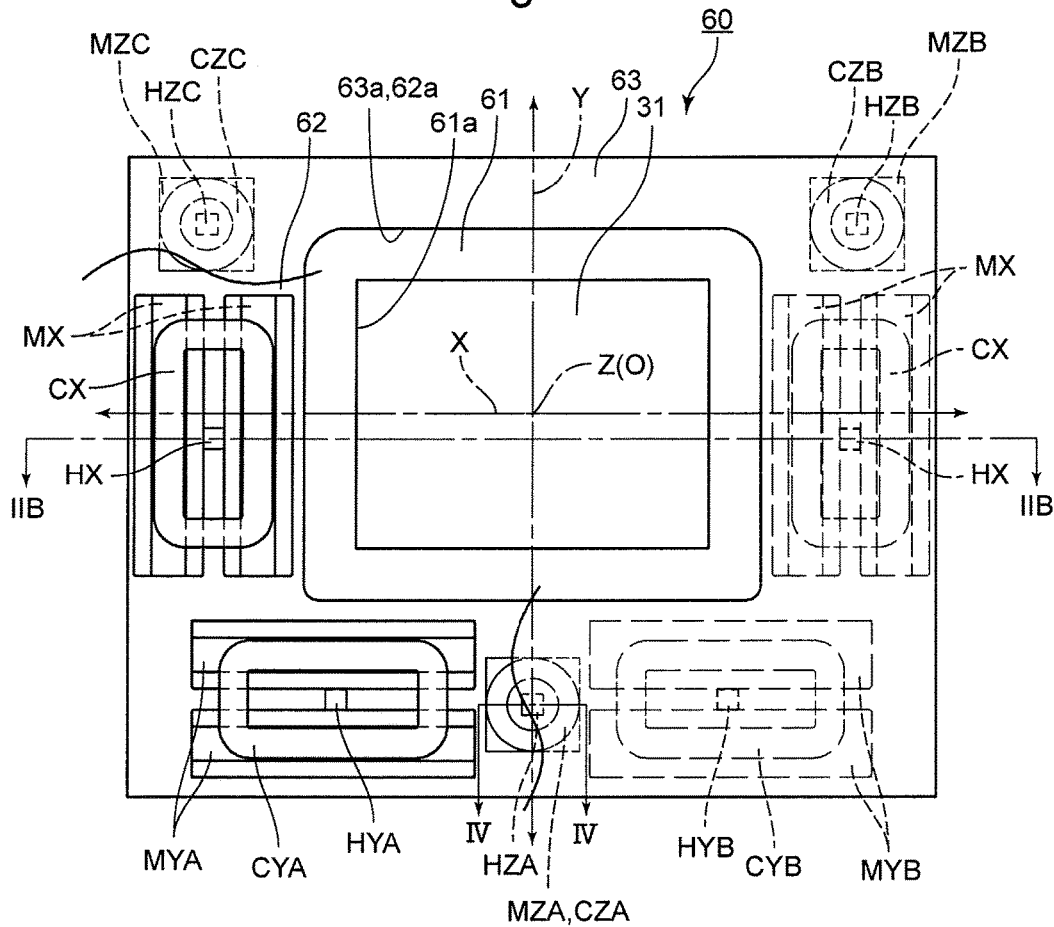
FIG. 2A is a rear elevational view of a first embodiment of the stage apparatus with six degrees of freedom according to the present invention, wherein a rear yoke and a movable stage are not shown in a right half of FIG. 2A.
Figure 2B:
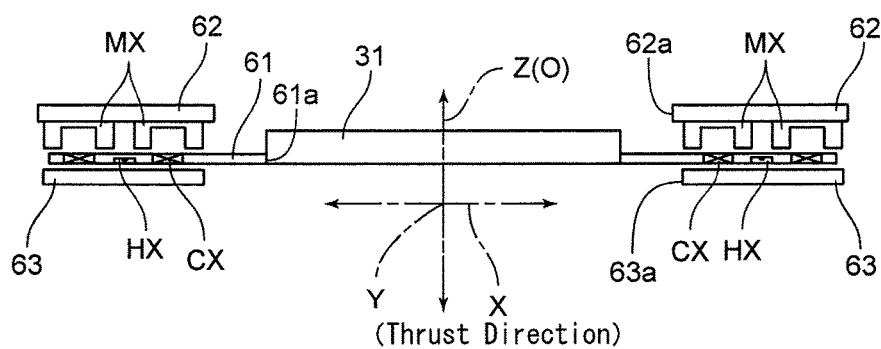
FIG. 2B is a sectional view taken along the section line IIB-IIB shown in FIG. 2A.
Figure 4:
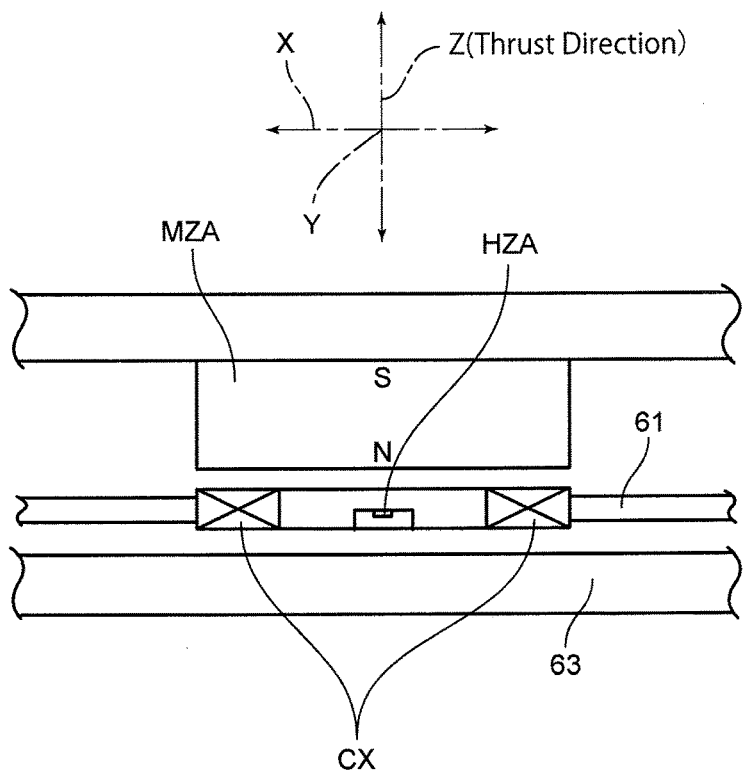
FIG. 4 is an enlarged sectional view taken along the section line IV-IV shown in FIG. 2A.

The stage apparatus 60 is further provided on the rear of the front fixed yoke 62 with three Z-direction magnets MZA, MZB and MZC, which are configured of permanent magnetic having the same specifications, at three positions different from the positions of the X-direction magnets MX, and the Y-direction magnets MYA and MYB (see FIG. 2A). Each of the Z-direction magnets MZA, MZB and MZC is a plate-like magnet which has a rectangular shape in a front elevational view, and the front surface (the surface that contacts the front fixed yoke 62) is the south pole and the rear surface (the surface that faces the movable stage 61) is the north pole (FIG. 4). The three Z-direction magnets MZA, MZB and MZC have the same specifications, and are provided at approximately equi-angular intervals on a circle about the Z-axis on a plane that is orthogonal to the Z-axis. Due to the passage of magnetic flux of the Z-direction magnets MZA, MZB and MZC through the front fixed yoke 62 and the rear fixed yoke 63 a portion of a magnetic circuit (thrust generator/thrust controller) which generates thrust in the Z-direction (the first direction) is formed between the Z-direction magnets MZA, MZB and MZC and the portions of the rear fixed yoke 63 that face the Z-direction magnets MZA, MZB and MZC.

The movable stage 61, which is positioned between the front fixed yoke 62 and the rear fixed yoke 63, is a nonmagnetic member which is formed of a nonmagnetic material as a single-piece member by press-molding. The movable stage 61 is provided at a central portion thereof with an image sensor mounting hole 61a, having the shape of a rectangle as viewed from the front, and the image sensor 31 is fitted into the image sensor mounting hole 61a and fixed thereto. The image sensor 31 protrudes from the image sensor mounting hole 61a forwardly toward the front of the movable stage 61 in the optical axis direction.

When the movable stage 61 sits at the initial position (with the movable stage 61 magnetically levitated), the image sensor 31 is positioned so that the long sides of the image sensor 31 extend parallel to the X-axis and so that the short sides of the image sensor 31 extend parallel to the Y-axis. When the movable stage 61 sits at the initial position, the center of the imaging surface of the image sensor 31 is positioned on the optical axis O of the photographic lens 101, and the optical axis O and the Z-axis are aligned with each other. The Z-direction (the first direction), the X-direction (the second direction) and the Y-direction (the third direction) will be hereinafter described as fixed directions with respect to the camera body 11 and the photographic lens 101, with the Z-direction parallel to (including being aligned with) the optical axis O; however, the Z-direction (the first direction), the X-direction (the second direction) and the Y-direction (the third direction) can be fixed directions with respect to the image sensor 31.

The stage apparatus 60 is provided with a pair of X-drive coils (X-driver) CX which are fixed to the movable stage 61 on either side (left and right sides) of the image sensor 31 in the X-direction to be located to the left and right of the left and right sides (short sides) of the image sensor 31, respectively. The stage apparatus 60 is provided with a pair of Y-drive coils: a Y-drive coil (YA-driver) CYA and a Y-drive coil (YB-driver) CYB which are fixed to the movable stage 61 to be located below the lower side (long side) of the image sensor 31 and to be spaced from each other in the leftward and rightward directions (i.e., in the X-direction). The pair of X-drive coils (X-driver) CX are vertically elongated in the Y-direction and arranged at symmetrical positions with respect to the Y-axis (at equi-distant positions from the Y-axis) so that the longitudinal directions of the pair of X-drive coils CX extend parallel to the Y-direction and intersect the X-axis. The pair of Y-drive coils CYA and CYB are laterally elongated in the X-direction and arranged at symmetrical positions with respect to the Y-axis (at equi-distant positions from the Y-axis) so that the longitudinal directions of the pair of Y-drive coils CYA and CYB extend parallel to the X-direction. According to this arrangement, manufacture, adjustment and control of the stage apparatus 60 is facilitated.

The stage apparatus 60 is further provided with three circular coils: a Z-drive coil (ZA-driver) CZA, a Z-drive coil (ZB-driver) CZB and a Z-drive coil (ZC-driver) CZC which are fixed to the movable stage 61. The Z-drive coil CZA is fixed at a position (middle position) between the pair of Y-drive coils CYA and CYB, and the Z-drive coils CZB and CZC are fixed above the pair of X-drive coils CX, respectively. The Z-drive coil CZA is arranged on the Y-axis, and the Z-drive coils CZB and CZC are arranged to be symmetrical with respect to the Y-axis (at equi-distant positions from the Y-axis). The center of gravity (the center of gravity of the whole) of the Z-drive coils CZA, CZB and CZC is substantially coincident with the center of gravity of the movable stage 61. It is desirable that the Z-drive coils CZA, CZB and CZC be arranged so that a line which connects two of the three Z-drive coils CZA, CZB and CZC extends parallel to one of the X-axis and the Y-axis and so that a line which extends from the remaining one of the three Z-drive coils CZA, CZB and CZC and is orthogonal to the aforementioned connecting line extends parallel to (or aligns with) the other of the X-axis and the Y-axis. In the first embodiment of the stage apparatus, the Z-drive coils CZA, CZB and CZC are arranged so that a line which connects the two Z-drive coils CZB and CZC extends parallel to the X-axis and so that a line which extends from the Z-drive coil CZA and is orthogonal to the aforementioned connecting line aligns with the Y-axis as shown in FIG. 2A. According to this arrangement, manufacture, adjustment and control of the stage apparatus 60 is facilitated.

The pair of X-drive coils CX, the pair of Y-drive coils CYA and CYB and the three Z-drive coils CZA, CZB and CZC are flat (thin) coils which are arranged to be parallel to a plane (X-Y plane) orthogonal to the optical axis O. Each of these seven flat coils is made of a plurality of turns of a conductive wire wound in the X-Y plane which are in turn multi-layered in the thickness direction of the movable stage 61 (i.e., in the Z-direction).

The pair of X-drive coils CX are arranged so that the long portions (long sides) thereof extend parallel to the Y-axis and face the corresponding X-direction magnets MX, while the pair of Y-drive coils CYA and CYB are arranged so that the long portions (long sides) thereof extend parallel to the X-axis and face the pair of Y-direction magnets MYA and MYA, respectively.

The pair of X-drive coils CX, the Y-drive coil CYA, the Y-drive coil CYB, the Z-drive coil CZA, the Z-drive coil CZB and the Z-drive coil CZC are all connected to an actuator drive circuit 42 (see FIG. 1), and the passage of electric current through each of these seven coils is controlled via the actuator drive circuit 42.

Each X-drive coil CX and the associated X-direction magnets MX constitute a thrust generator (thrust controller) which generates thrust in the X-direction (the second direction). The movable stage 61 can be translated in the X-direction by the thrust force in the X-direction which is generated by controlling the current through the pair of X-drive coils CX. Each X-drive coil CX and the associated X-direction magnets MX also act (function) as a levitator which levitates and holds the movable stage 61 at a center position (initial position) regardless of the attitude of the camera body 11, e.g., when the camera is held in a vertical position in which the grip of the camera body 11 faces up or down, or at an inclined angle other than a horizontal position.

The Y-drive coil CYA and the pair of Y-direction magnets MYA, and the Y-drive coil CYB and the pair of Y-direction magnets MYB constitute a pair of thrust generators (thrust controllers), each of which generates thrust in the Y-direction (the third direction). The movable stage 61 can be translated in the Y-direction and turned (rotated) about the Z-direction (Z-axis) by interaction of a pair of thrust forces in the Y-direction which are generated by controlling the currents through the pair of Y-drive coils CYA and CYB, spaced from each other in the X-direction. The Y-drive coil CYA and the pair of Y-direction magnets MYA, and the Y-drive coil CYB and the pair of Y-direction magnets MYB also act (function) as a levitator which levitates and holds the movable stage 61 at a center position (initial position) regardless of the attitude of the camera body 11, and especially when the camera is held in a normal position (horizontal position).

The three Z-drive coils CZA, CZB and CZC and the three Z-direction magnets MZA, MZB and MZC respectively constitute three thrust generators (thrust controllers) that respectively generate thrust in the Z-direction (first direction). With the three Z-drive coils CZA, CZB and CZC and the corresponding three Z-direction magnets MZA, MZB and MZC positioned away from each other on an X-Y plane, and due to interaction of three thrust forces in the Z-direction which are generated by controlling the currents through the three Z-drive coils CZA, CZB and CZC, the movable stage 61 can be levitated without contacting either the front fixed yoke 62 or the rear fixed yoke 63 (without contacting any of the three Z-direction magnets MZA, MZB and MZC), and the movable stage 61 can be translated in the Z-direction, tilted about the X-direction and tilted about the Y-direction.

The Z-drive coils CZA, CZB and CZC and the pairs of Z-direction magnets MZA1 and MZA2, MZB1 and MZB2, and MZC1 and MZC2 also act (function) as a levitator which levitates and holds the movable stage 61 at an initial position relative to the optical axis direction and at an initial attitude (at an initial position in which the imaging surface of the image sensor 31 is orthogonal to the optical axis O).

The magnetic flux densities (magnetic forces) of the X-direction magnets MX and the pairs of Y-direction magnets MYA and MYB (which generate thrust forces to move the movable stage 61 in the X-direction and the Y-direction within a plane orthogonal to the optical axis) toward the pair of X-drive coils CX and the pair of Y-drive coils CYA and CYB, respectively, are not uniform, but change in the thrust directions along the X-direction and the Y-direction.

Figure 3:
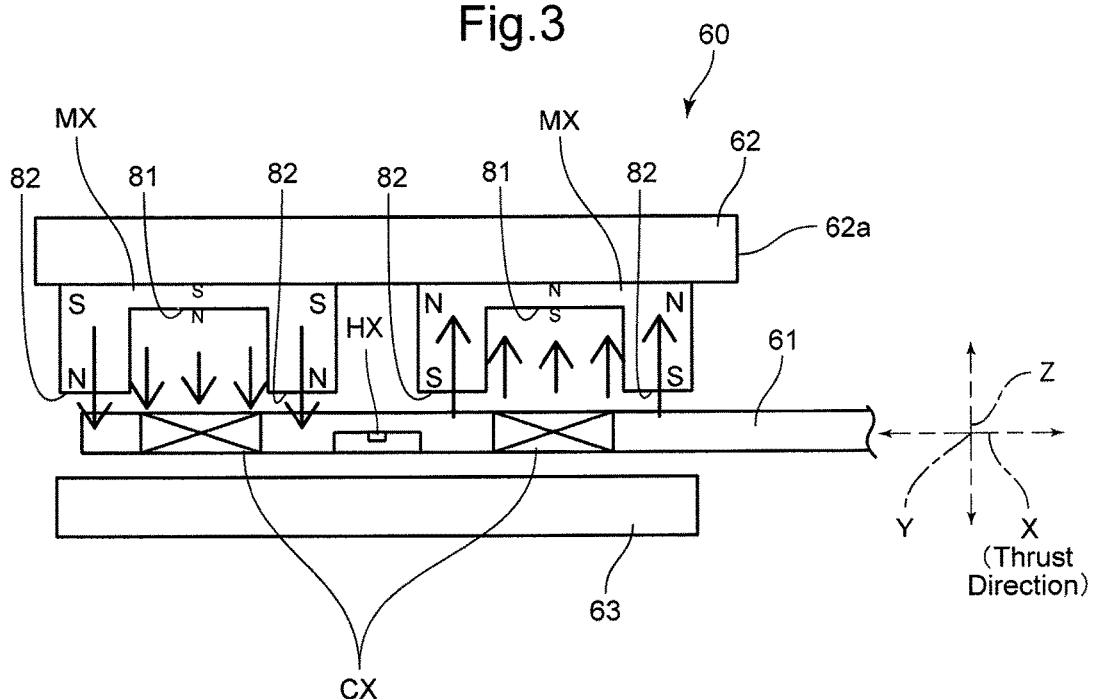
FIG. 3 is an enlarged sectional view of one of a pair of X-direction thrust generators shown in FIG. 2B.

FIG. 3 shows the pair of X-direction magnets MX arranged on the left side of the stage apparatus 60. The magnetic flux density (magnetic force) that occurs in the X-direction magnets MX is indicated with arrows. Each of the pair of X-direction magnets MX is provided with a recess 81 on a central portion, with respect to the X-direction (which is the thrust direction generated thereby), of a surface thereof that faces a corresponding X-drive coil CX, and wall portions 82 provided on either side (edge) of the recess 81, so that each X-direction magnet MX has a recessed cross-sectional shape. The depth of each recess 81 is approximately ⅗ through ⅘ of the thickness of the X-direction magnet MX (the height of the wall portions 82).

The width of each recess 81 in the X-direction (thrust direction) of the each X-direction magnet MX is larger than the X-direction width of one Y-direction (longitudinal direction/a direction orthogonal to thrust direction) coil-winding portion of the X-drive coils CX.

Figure 5:
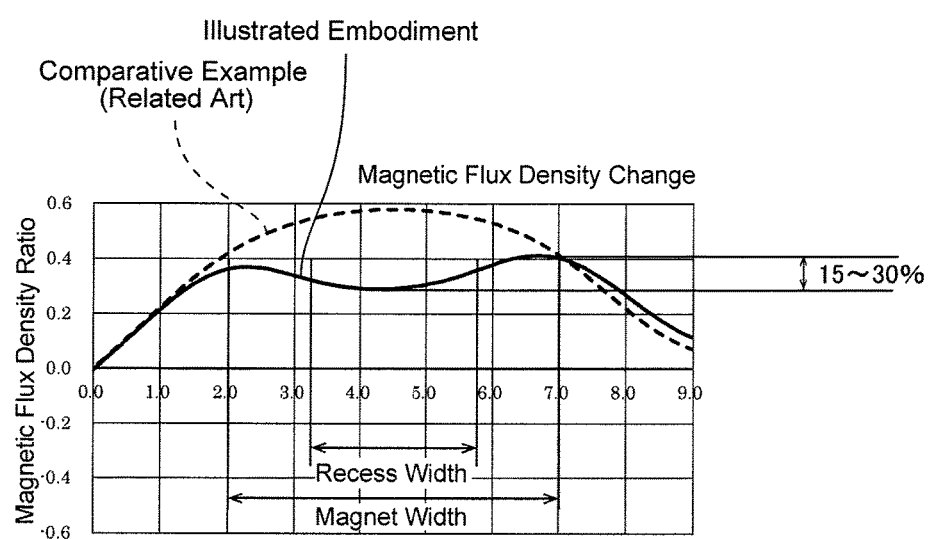
FIG. 5 shows a graph of an X-direction magnetic flux density distribution of an X-direction magnet of each X-direction thrust generator.

The pair of X-direction magnets MX provides a substantial concave distribution of a thrust direction (X-direction) distribution of magnetic flux density, in which a central (recess 81) portion of the distribution is the lowest and the portions (wall portions 82) at either side thereof are the highest, due to the shape of the recess 81 and the wall portions 82. The change in the magnetic flux density (magnetic flux density distribution) in the X-direction that is dependent on the shape of the recess 81 of the X-direction magnet MX is shown in FIG. 5. In FIG. 5, the horizontal axis indicates a position in the X-direction, and the vertical axis indicates the magnetic flux density ratio. The magnetic flux distribution of the illustrated embodiment has the lowest magnetic flux density ratio at the center of the recess 81 and has the highest magnetic flux density ratio at either end (wall portions 82) of the recess 81 with respect to the X-direction (of the X-direction magnet MX). FIG. 5 also shows a magnetic flux distribution of a comparative example in which the recess 81 is not provided. In the magnetic flux distribution of the comparative example, the central portion of the magnet has the highest magnetic flux density ratio, and the magnetic flux density ratio gently declines toward either end of the magnet. In the illustrated embodiment, the magnetic flux density ratio at the central (recess 81) portion of the distribution is 0.15 through 0.3 less (15% through 30% less) than the magnetic flux density ratio at either end (wall portions 82) thereof. The pair of X-direction magnets MX have the same shape but have opposite magnetic poles to each other (as shown in FIG. 3); however, the magnetic flux density distribution in the thrust direction (X-direction) is the same.

Although not shown in the drawings, each of the pair of Y-direction magnets MYA and each of the pair of Y-direction magnets MYB are respectively provided with a recess on a central portion, with respect to the Y-direction (which is the thrust direction generated thereby), of a surface thereof that faces corresponding Y-drive coils CYA and CYB, respectively, and wall portions provided on either side (edge) of the recess, so that each of the pair of Y-direction magnets MYA and each of the pair of Y-direction magnets MYB has a recessed cross-sectional shape. The depth of the recess of each of the pair of Y-direction magnets MYA and each of the pair of Y-direction magnets MYB is approximately ⅗ through ⅘ of the thickness of the Y-direction magnets MYA and MYB. The width of the recess in the Y-direction (thrust direction) of each of the pair of Y-direction magnets MYA and the pair of Y-direction magnets MYB is larger than the Y-direction width of one X-direction (longitudinal direction/a direction orthogonal to thrust direction) coil-winding portion of the pair of Y-direction magnets MYA and the pair of Y-direction magnets MYB. Hence, each of the pair of Y-direction magnets MYA and the pair of Y-direction magnets MYB provides a substantial concave shaped thrust-direction (Y-direction) distribution of magnetic flux density, in which a central (recess) portion of the distribution is the lowest and the portions (wall portions) at either side thereof are the highest. The pair of Y-direction magnets MYA have the same shape but have opposite magnetic poles to each other; however, the magnetic flux density distribution in the thrust direction (Y-direction) is the same. Similarly the pair of Y-direction magnets MYB have the same shape but have opposite magnetic poles to each other; however, the magnetic flux density distribution in the thrust direction (Y-direction) is the same.

Figure 6A:
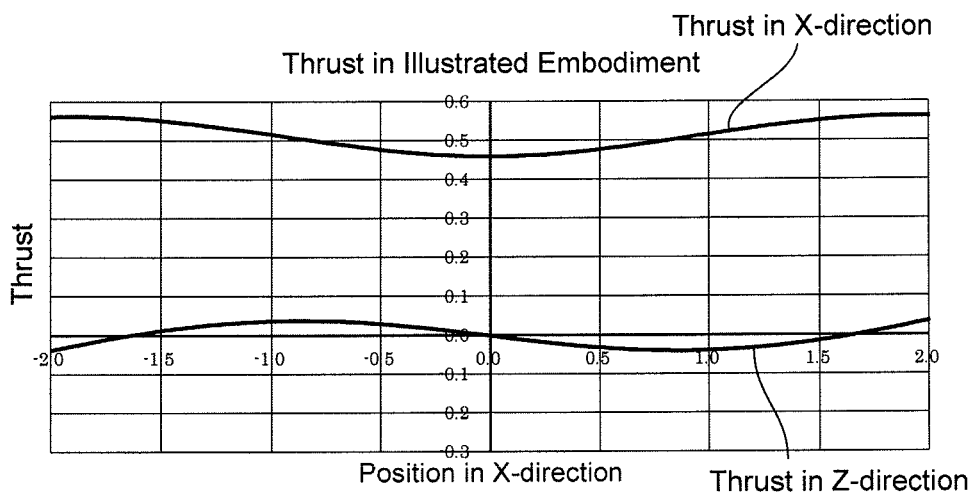
FIG. 6A shows a graph of a relationship between the position of the movable stage and the thrust of the X-direction thrust generators, which drives the movable stage, according to the illustrated embodiment.
Figure 6B:
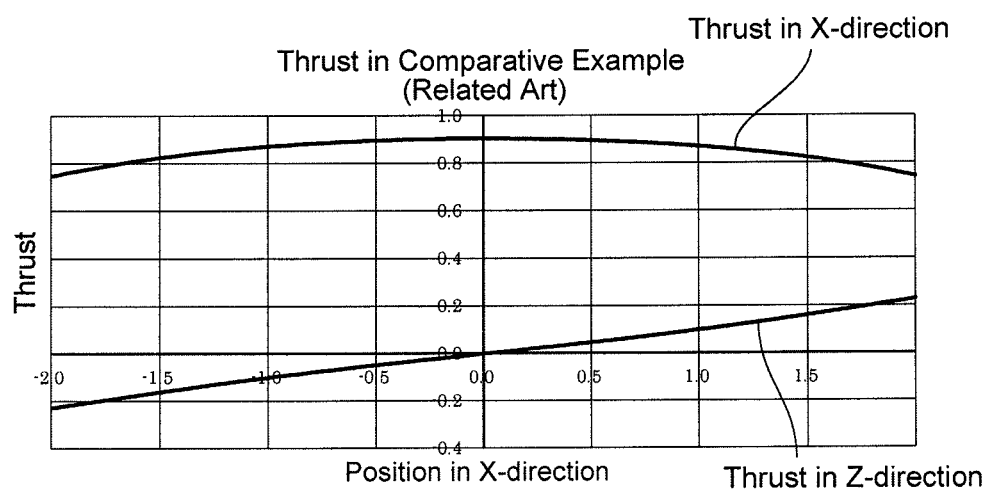
FIG. 6B shows a graph of a relationship between the position of the movable stage and the thrust of the X-direction thrust generators, which drives the movable stage, according to a comparative example.

FIG. 6A shows a graph of a relationship between the position of the movable stage 61, of the stage apparatus 60 of the illustrated embodiment, in the X-direction, and the thrust in the X-direction and the thrust in the Z-direction. FIG. 6B shows a graph of a relationship between the position of a movable stage (corresponding to the movable stage 61) in the X-direction, the thrust in the X-direction and the thrust in the Z-direction of the stage apparatus of the comparative example (related art), in the case where an X-direction magnet of the related art is used. In the graphs of FIGS. 6A and 6B, the horizontal axis indicates a position in the X-direction, and the vertical axis indicates the thrust force.

As can be clearly understood from the graphs of FIGS. 6A and 6B, in the stage apparatus 60 of the illustrated embodiment, even if the movable stage 61 is moved in the X-direction from the central position, fluctuation of the thrust in the X-direction is small, the thrust in the Z-direction is small, and fluctuation of the thrust in the Z-direction is small, regardless of the X-direction position. Whereas, in the comparative example (related art), if the movable stage 61 is moved in the X-direction from the central position, the thrust in the X-direction deteriorates, or a thrust in the Z-direction increases greatly.

The movable stage 61 is provided with a pair of X-direction Hall elements (X-position detector) HX positioned at approximate centers of air-core areas of the pair of X-drive coils CX, respectively; a Y-direction Hall element HYA (YA-position detector) and a Y-direction Hall element HYB (YB-position detector) positioned at approximate centers of air-core areas of the Y-drive coils CYA and CYB, respectively; and a Z-direction Hall element HZA (ZA-position detector), a Z-direction Hall element HZB (ZB-position detector) and a Z-direction Hall element HZC (ZC-position detector) positioned at approximate centers of air-core areas of the Z-drive coils CZA, CZB and CZC, respectively. These Hall elements HX, HYA, HYB, HZA, HZB, HZC are all fixed to the movable stage 61 and are each connected to the position detection circuit 43.

Each of the pair of X-direction Hall elements HX constitute a position detector which detects the magnetic force (magnetic flux of an X-direction magnetic circuit) of the corresponding X-direction permanent magnet MX. Furthermore, the position detection circuit 43 detects the X-direction translation position of the movable stage 61 by a predetermined calculation that utilizes detection signals from the pair of X-direction Hall elements HX. Hence, the translation position in the X-direction can be detected by the detection signals of the pair of X-direction Hall elements HX.

The Y-direction Hall elements HYA and HYB constitute a position detector, in which the Y-direction Hall element HYA detects the magnetic force (magnetic flux of an Y-direction magnetic circuit) of the corresponding pair of Y-direction magnets MYA and the Y-direction Hall element HYB detects the magnetic force (magnetic flux of an Y-direction magnetic circuit) of the corresponding pair of Y-direction magnets MYB. Furthermore, the position detection circuit 43 detects a Y-direction translation position and a turning (rotation/tilt) position of the movable stage 61 about the Z-direction by a predetermined calculation that utilizes detection signals from both of the Y-direction Hall elements HYA and HYB. Hence, the translation position in the Y-direction and the turning (rotation/tilt) position about the Z-direction of the movable stage 61 can be detected by the detection signals of the Y-direction Hall elements HYA and HYB.

The Z-direction Hall elements HZA, HZB and HZC constitute a position detector which detects the magnetic force (magnetic flux of an Z-direction magnetic circuit) of the corresponding Z-direction magnets MZA, MZB and MZC. Furthermore, the position detection circuit 43 detects a Z-direction translation position, a turning (rotation/tilt) position about the X-direction and a turning (rotation/tilt) position about the Y-direction of the movable stage 61 by a predetermined calculation that utilizes detection signals from of the Z-direction Hall elements HZA, HZB and HZC. Hence, the translation position in the Z-direction, the tilt (rotation) position about the X-direction, and the tilt (rotation) position about the Y-direction of the movable stage 61 can be detected by the detection signals of the Z-direction Hall elements HZA, HZB and HZC.

The position detection circuit 43 sends one or a plurality of detection signals, detected by the pair of X-direction Hall elements HX, Y-direction Hall elements HYA and HYB, and Z-direction Hall elements HZA, HZB and HZC, to the body CPU 20. The body CPU 20 constitutes a calculator which calculates, using the above-mentioned detection signals, the translation position of the movable stage 61 with respect to the Z-direction (first direction), the X-direction (second direction) and the Y-direction (third direction), and calculates an tilt (rotational) position of the movable stage 61 about the Z-direction (first direction), the X-direction (second direction) and the Y-direction (third direction).

The pair of X-drive coils CX, the Y-drive coils CYA and CYB, the Z-drive coils CZA, CZB and CZC, the X-direction Hall elements HX, the Y-direction Hall elements HYA and HYB, and the Z-direction Hall elements HZA, HZB and HZC are mounted onto a flexible printed circuit board (not shown), and are electrically connected to the various circuits such as the actuator drive circuit 42 and the position detection circuit 43, etc., that are in-built within the camera body 11 via a flexible printed circuit board (not shown) that extends from the movable stage 61 (see FIG. 1).

The pair of X-drive coils CX, the pair Y-drive coils CYA and CYB, and the three Z-drive coils CZA, CZB and CZC are electrically controlled by the actuator drive circuit 42. The actuator drive circuit 42 is controlled by the body CPU 20 via an anti-shake control circuit 41.

The position detection circuit 43 detects the X-direction position, the Y-direction position, the Z-direction position, the tilt position (rotational position/angular position/pitch angle) about the X-direction, the tilt position (rotational position/angular position/yaw angle) about the Y-direction, and the tilt position (rotational position/angular position/roll angle) about the Z-direction of the movable stage 61 using the detection signals detected by the X-direction Hall elements HX, the Y-direction Hall elements HYA and HYB, and the Z-direction Hall elements HZA, HZB and HZC.

Under control of the body CPU 20, the digital camera 10 levitates the movable stage 61 in between the front fixed yoke 62 and the rear fixed yoke 63 by controlling energization of the pair of X-drive coils CX, the pair of Y-drive coils CYA and CYB and the three Z-drive coils CZA, CZB and CZC via the actuator drive circuit 42 based on the positions calculated by the position detection circuits 43.

The digital camera 10 can carry out the below-described drive control with the movable stage 61 in a levitated state based on each position calculated by the body CPU 20 (position detection circuits 43).

The movable stage 61 can be translated in the Z-direction by interaction of three equal thrust forces in the Z-direction that are generated by controlling currents through the three Z-drive coils CZA, CZB and CZC by equal amounts. Furthermore, the movable stage 61 can be tilted (rotated) about the X-direction and can be tilted (rotated) about the Y-direction by interaction of three different thrust forces in the Z-direction that are generated by individually controlling currents through the three Z-drive coils CZA, CZB and CZC.

The movable stage 61 can be translated in the X-direction by a thrust force in the X-direction that is generated by controlling a current through each X-drive coil.

The movable stage 61 can be translated in the Y-direction by interaction of two thrust forces in the Y-direction that are generated by controlling currents through the Y-drive coils CYA and CYB by equal amounts. Furthermore, the movable stage 61 can be turned (rotated) about the Z-direction by interaction of two different thrust forces in the Y-direction that are generated by individually controlling currents through the Y-drive coils CYA and CYB.

Hence, the movable stage 61 can be translated, tilted/turned, tilted/turned while being translated, translated after being tilted/turned, and tilted/turned after being translated in all six directions with six degrees of freedom (6DoF) by interaction of thrust forces in the Z-direction, thrust forces in the X-direction and thrust forces in the Y-direction which are generated by controlling currents in the Z-drive coils CZA, CZB and CZC, the X-drive coil(s) CX and the Y-drive coils CYA and CYB.

The body CPU 20 carries out a hand-shake correction operation by synchronizing the above-described drive control of the movable stage 61 with shake (hand-shake/vibrations) applied to the photographic lens 101 and camera body 11 detected by the camera shake detecting circuit 44.

In the stage apparatus 60 of the illustrated embodiment, most of the thrust force that is generated upon electric current being passed through the pair of X-drive coils CX and the Y-drive coils CYA and CYB is an X-direction component and a Y-direction component, regardless of the position of the movable stage 61 in the X-Y plane, the X-direction and Y-direction component thrust forces do not fluctuate much. Therefore, since a component force that is non-parallel (a force component in a direction away from the X-Y plane/Z-direction component) to the X-Y plane is extremely small, the movable stage 61 translates in a direction that is parallel to the X-Y plane, and the movable stage 61 tilts (rotates) within the X-Y plane (about the Z-direction). In other words, since the movable stage 61 does not tilt or angular-shake relative to the X-Y plane nor move in the Z-direction, noise does not occur and the imaging plane (imaging surface) does not tilt, so that a focusing error does not occur.

In the first embodiment, in order to provide different magnetic flux densities, along the thrust direction, of the X-direction permanent magnets MX and the Y-direction magnets MYA and MYB toward the X-drive coils CX and the Y-drive coils CYA and CYB, a recess 81 having a depth of approximately $3/5$ through $4/5$ of the thickness of the X-direction permanent magnet MX (height of the wall portions 82) is formed in each of the X-direction permanent magnet MX and the Y-direction magnets MYA and MYB on surfaces thereof that face the pair of X-drive coils CX, and the Y-drive coils CYA and CYB, respectively. The depth and width of the recess 81 is set in accordance with the relationship between the material and overall width of the magnets, the drive coils and yokes that constitute the thrust generators, and the amount of movement of the movable stage 61, etc.

Although it is desirable for the depth of the recess 81 to be ⅗ through ⅘ of the thickness (height of the wall portions 82) of the magnet, it is acceptable for the depth of the recess 81 to be within the range of ⅖ through 4.5/5. If the depth of the recess 81 is shallower than the minimum value (⅖), although the overall magnetic flux density is increased, the Z-direction component force also increases, so that fluctuation in the thrust in the X-direction and Y-direction increases. If the depth of the recess 81 is deeper than the maximum value (4.5/5), the overall magnetic flux density becomes too low, the ratio of the Z-direction component force becomes large, so that fluctuation in the thrust in the X-direction and Y-direction relatively increases. In other words, if the depth of the recess 81 is swallower than the lower limit or deeper than the upper limit, fluctuation in the thrust in the X-direction and Y-direction increases and the Z-direction component force increases in the movement range of the movable stage 61.

If the width in the X-direction of the recess 81 of the X-direction permanent magnet MX is narrower than the width in the X-direction of the Y-direction (longitudinal direction) coil-winding portion of the X-drive coil CX, the above-described effects cannot be achieved.

The above-described limitations and effects are also the same for the Y-direction magnets MYA and MYB.

In the first embodiment, the recess 81 is formed at a center portion, with respect to the thrust direction, in each of the X-direction permanent magnets MX, and the Y-direction magnets MYA and MYB. In an alternative embodiment, the surfaces of the X-direction permanent magnets MX, and the Y-direction magnets MYA and MYB that face the pair of X-drive coils CX, and the Y-drive coils CYA and CYB can be formed as flat surfaces, and each of the X-direction permanent magnets MX, and the Y-direction magnets MYA and MYB can have a changing magnetizing strength distribution with respect to the thrust direction.

Figure 7A:
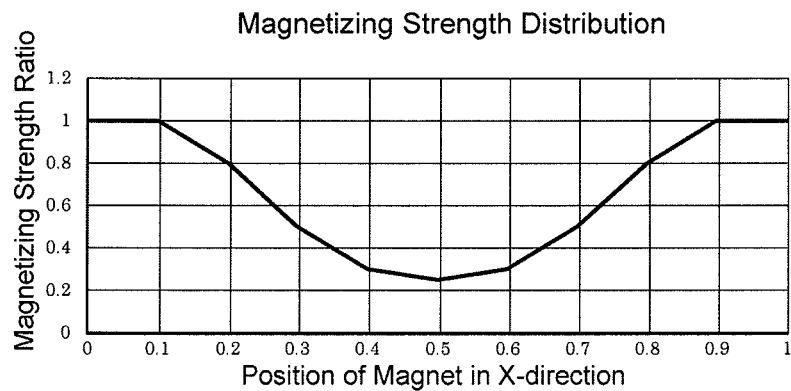
FIGS. 7A, 7B and 7C are graphs of embodiments of different magnetizing strength distributions of a magnet of the stage apparatus.
Figure 7B:
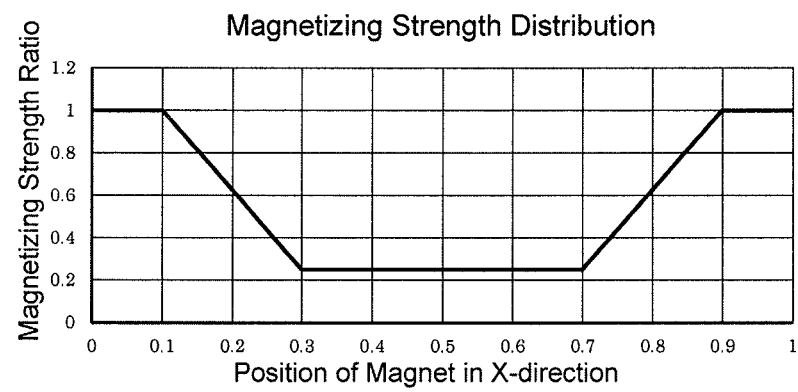
Figure 7C:
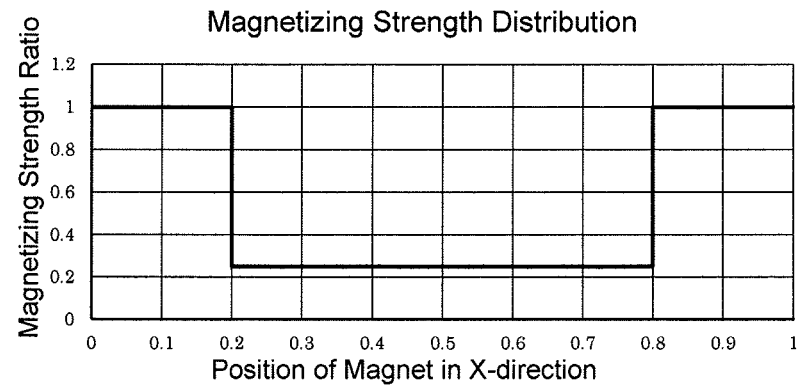

FIGS. 7A through 7C are graphs of embodiments of different magnetizing strength (magnetizing force) distributions (distribution characteristics) of the X-direction permanent magnet MX. In each of FIGS. 7A through 7C, the horizontal axis indicates the X-direction position of the X-direction permanent magnet MX, and the vertical axis indicates the magnetizing strength ratio. The magnetizing strength ratio is a strength ratio in which the magnetizing strength at either end of the X-direction permanent magnet MX in the X-direction is set to 1. The origin "0" on horizontal axis indicates a central position of the X-direction permanent magnet MX in the X-direction.

In the embodiment shown in FIG. 7A, the magnetizing strength ratio is distributed to be maximum at either end of the X-direction permanent magnet MX in the X-direction, and forms a concave shape that gently reduces in size toward the central portion.

In the embodiment shown in FIG. 7B, the magnetizing strength ratio is distributed to be maximum at either end of the X-direction permanent magnet MX in the X-direction, and forms a reversed trapezoidal shape (trapezoidal groove shape) that reduces in size toward the central portion and has a constant-range portion at the central portion.

In the embodiment shown in FIG. 7C, the magnetizing strength ratio is distributed to be maximum at either end of the X-direction permanent magnet MX in the X-direction, maintains a constant value from either end toward the central portion, and thereafter suddenly reduces in size to thereby form a rectangular shape.

The magnetizing strength and magnetizing force refer to the magnetic force when magnetizing the magnet; whereas, magnetic flux density refers to the held magnetizing density (remanence) after being magnetized by a magnetizing force.

In each of the above-described embodiments, the magnetizing force (magnetizing strength) ratio at either end, with respect to the thrust direction, of the X-direction permanent magnet MX and the magnetizing force (magnetizing strength) ratio of the central portion, with respect to the thrust direction, only need to be such that the magnetizing force ratio at the central portion is 0.15 through 0.3 (15% through 30%) less than the magnetizing force ratio at either end.

The magnetic flux density at the central portion is approximately 0.15 through 0.3 (15% through 30%) less than the magnetic flux density ratio at either end of the X-direction permanent magnet MX with respect to the thrust direction.

The magnetizing force (magnetizing strength) ratio and the magnetic flux density ratio are determined (set) by the relationship of the material of the magnet, the overall size of the magnet, the drive coils and yokes that constitute the thrust generators, and the amount of movement of the movable stage 61. The above-described limitations and effects are also the same for the Y-direction magnets MYA and MYB.

If the lower limit of the magnetizing force (magnetizing strength) ratio and the magnetic flux density ratio is exceeded, the Z-direction component force becomes large, and if the upper limit of the magnetizing force (magnetizing strength) ratio and the magnetic flux density ratio is exceeded, the Z-direction component force becomes large. In other words, if the magnetizing force (magnetizing strength) ratio and the magnetic flux density ratio are greater than or less than the numeral range therefor, with respect to the movement range of the movable stage 61, fluctuation in the X-direction thrust and the Y-direction thrust increase and the Z-direction component force increases.

In regard to the magnetizing strength distribution of the above-described examples, thrust forces having similar characteristics to those in FIG. 6A can be generated in the same manner as the embodiment shown in FIGS. 2 through 4. In other words, the thrust in the X-direction and in the Y-direction does not fluctuate much regardless of the position of the movable stage 61 on the X-Y plane, and the component force in the Z-direction is extremely small. Accordingly, the movable stage 61 does not shake or move in the Z-direction, and noise and focusing error can be suppressed.

Second Embodiment

Figure 8A:
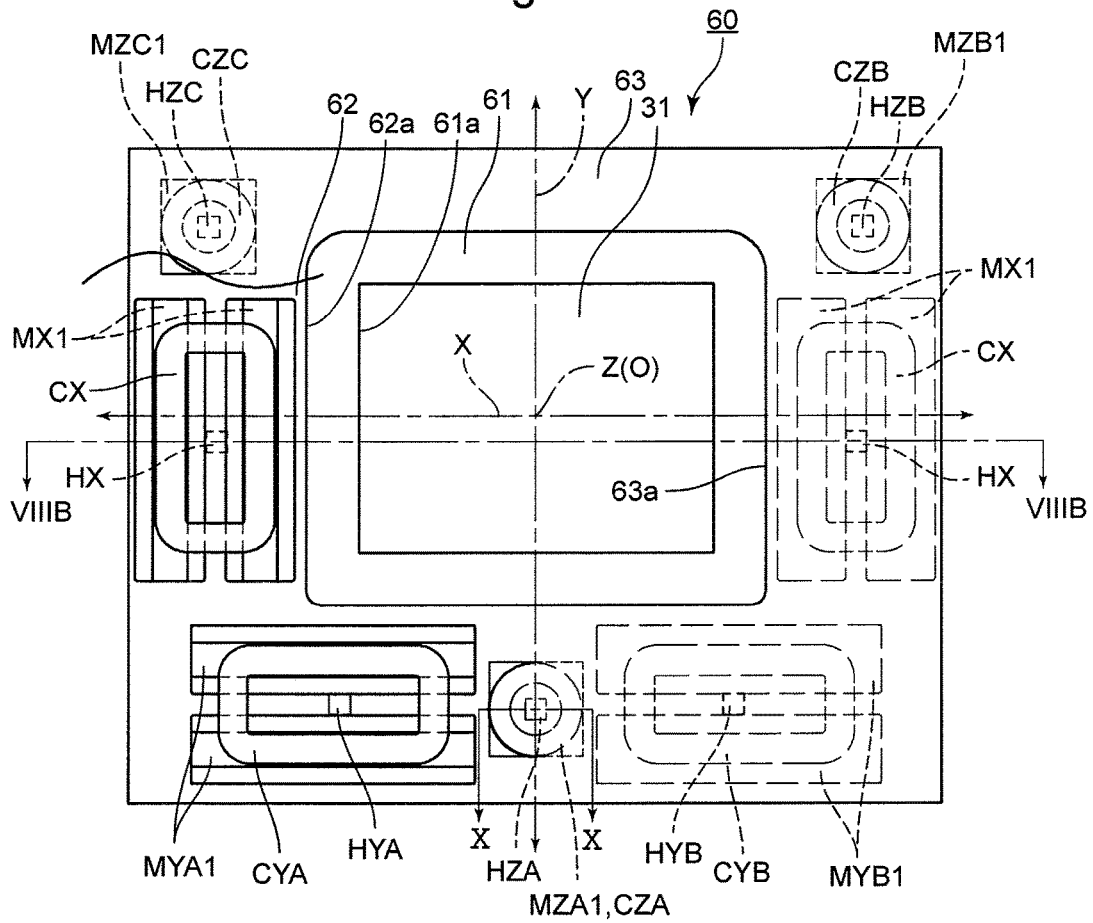
FIG. 8A is a rear elevational view of a second embodiment of the stage apparatus with six degrees of freedom according to the present invention, wherein a rear yoke and a movable stage are not shown in a right half of FIG. 8A.
Figure 8B:
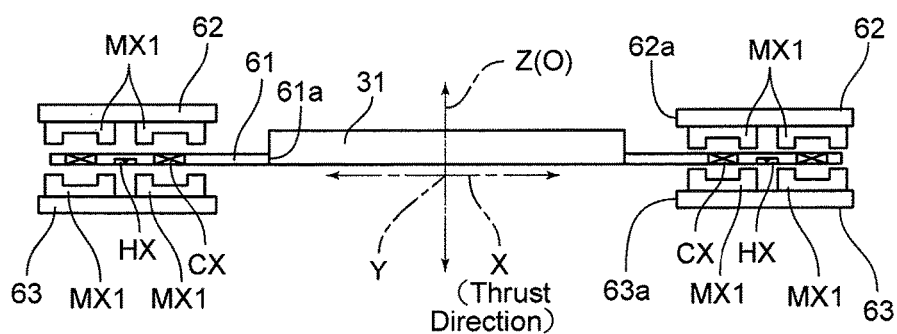
FIG. 8B is a sectional view taken along the section line VIIIB-VIIIB shown in FIG. 8A.
Figure 9:
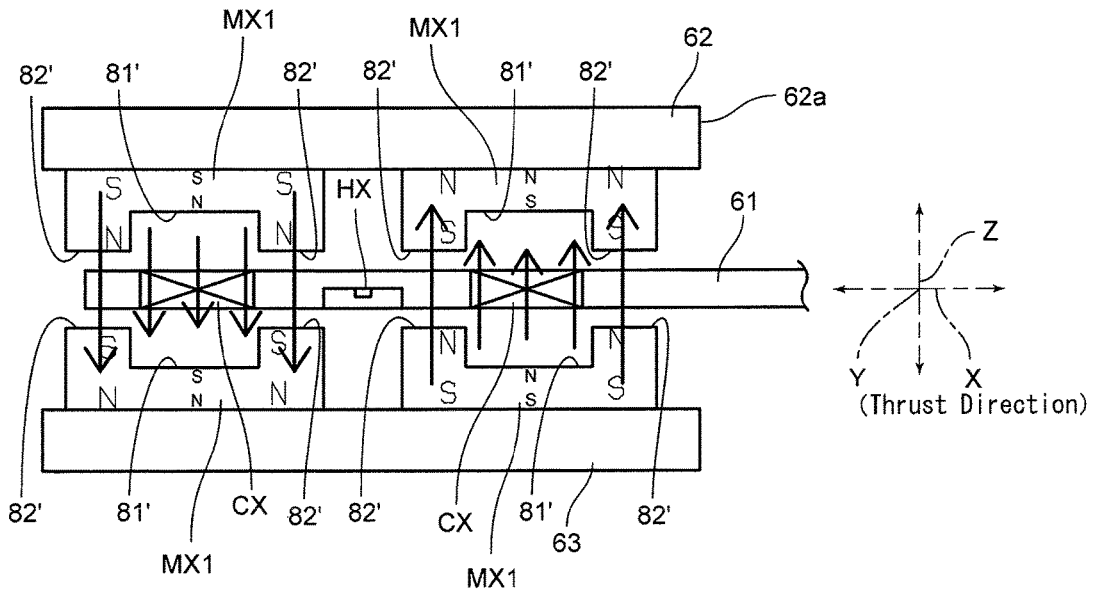
FIG. 9 is an enlarged sectional view of one of a pair of X-direction thrust generators shown in FIG. 8B.
Figure 10:
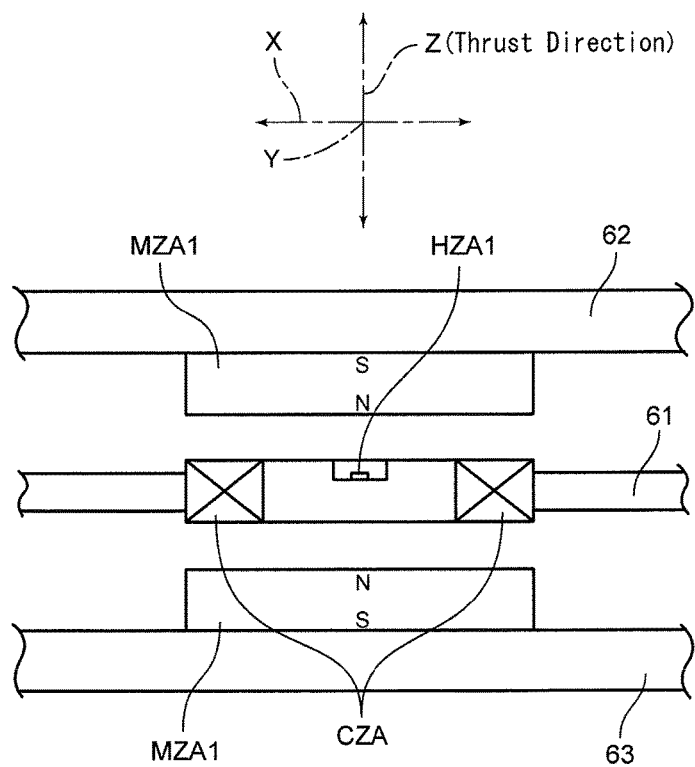
FIG. 10 is an enlarged sectional view taken along the section line X-X shown in FIG. 8A.

In the first embodiment, the X-direction permanent magnets MX and the Y-direction magnets MYA and MYB, which each constitute an element of a thrust generator, are only provided on the front fixed yoke 62. However, the X-direction permanent magnets MX and the Y-direction magnets MYA and MYB may additionally be provided on the rear fixed yoke 63. Alternatively, the X-direction permanent magnets MX and the Y-direction magnets MYA and MYB may be provided on the movable stage 61, and the X-drive coils CX and the Y-drive coils CYA and CYB may be provided on one of both of the front fixed yoke 62 and the rear fixed yoke 63. FIGS. 8 through 10 show a second embodiment in which X-direction permanent magnets MX1 and the Y-direction magnets MYA1 and MYB1, which each constitute an element of a thrust generator, are provided both on the front fixed yoke 62 and the rear fixed yoke 63. Members in the second embodiment that are the same as those in the first embodiment are designated with the same designators, and duplicate descriptions thereof are omitted.

In the second embodiment, a pair of X-direction permanent magnets MX1, Y-direction magnets MYA1 and MYB1, and Z-direction magnets MZA1, MZB1 and MZC1 are mounted onto the front fixed yoke 62, and a pair of X-direction permanent magnets MX1, Y-direction magnets MYA1 and MYB1, and Z-direction magnets MZA1, MZB1 and MZC1 (which respectively have the same specifications as those mounted onto the front fixed yoke 62) are mounted onto the rear fixed yoke 63. The movable stage 61 is provided with an X-drive coil CX positioned between X-direction permanent magnets MX1 and MX1, which mutually oppose in the Z-direction; a Y-drive coil CYA positioned between Y-direction magnets MYA and MYA, which mutually oppose in the Z-direction; a Y-drive coil CYB positioned between Y-direction magnets MYB and MYB, which mutually oppose in the Z-direction; and Z-drive coils CZA, CZB and CZC respectively positioned between Z-direction magnets MZA1 and MZA1, MZB1 and MZB1, and MZC1 and MZC1, which mutually oppose in the Z-direction, respectively.

The X-direction permanent magnets MX1, and the Y-direction magnets MYA1 and MYB1 of the rear fixed yoke 63 are arranged so that magnetic poles thereof face different magnetic poles of the X-direction permanent magnets MX1, and the Y-direction magnets MYA1 and MYB1 of front fixed yoke 62 (see FIG. 9). Whereas, the Z-direction magnets MZA1, MZB1 and MZC1 of the rear fixed yoke 63 are arranged so that magnetic poles thereof face the same magnetic poles of the Z-direction magnets MZA1, MZB1 and MZC1 of the front fixed yoke 62 (see FIG. 10).

Similar to the X-direction permanent magnets MX shown in FIGS. 2 and 3, each X-direction permanent magnet MX1 has a recessed cross-sectional shape. In other words, each X-direction permanent magnet MX1 has a recessed cross-sectional shape provided with a recess 81', in the surface thereof that faces a corresponding X-drive coil CX, in the central portion thereof with respect to the thrusting direction (X-direction), and wall portions 82' at either end of the recess 81', with respect to the thrusting direction (X-direction). Similarly, the Y-direction magnets MYA1 and MYB1 each have a recessed cross-sectional shape provided with a recess, in respective surfaces thereof that face corresponding Y-drive coils CYA and CYB, in the central portion thereof with respect to the thrusting direction (Y-direction), and wall portions at either end of the recess, with respect to the thrusting direction (Y-direction). However, the entire thickness of each X-direction permanent magnet MX1 is thinner than that of the X-direction permanent magnets MX shown in FIGS. 2 and 3. The Y-direction magnets MYA1 and MYB1 also have a similar shape to that of the X-direction permanent magnets MX1, and are thinner than the Y-direction magnets MYA and MYB of the first embodiment. The width of each recess 81' in the X-direction (thrust direction) of the each X-direction magnet MX1 is larger than the X-direction width of one Y-direction (longitudinal direction/a direction orthogonal to thrust direction) coil-winding portion of the X-drive coil CX.

The magnetic flux density distribution and the magnetizing force distribution of the X-direction magnets MX1 are the same or substantially the same as the magnetic flux density distribution and the magnetizing force distribution of the X-direction magnets MX (of the first embodiment). However, in accordance with experiments conducted by the inventor of the present invention, it is desirable for the depth of each recess 81' to be ¼ through ½ of the thickness (height of the wall portions 82') of the X-direction magnets MX1. It is desirable for the magnetizing force ratio at the central portion (recess 81') to be 0.2 through 0.5 (20% through 50%) less than the magnetizing force ratio at either end (wall portions 82') of each X-direction permanent magnet MX1.

The above-described configuration for the X-direction permanent magnet MX1 is also the same for the Y-direction magnets MYA1 and MYB1.

If the depth of the recess 81' is shallower than the lower limit (¼), the Z-direction component force increases; and if the depth of the recess 81' is deeper than the upper limit (½), the Z-direction component force increases.

If the magnetizing force (magnetizing strength) ratio exceeds the lower limit (0.2), the Z-direction component force increases; and if the magnetizing force (magnetizing strength) ratio exceeds the upper limit (0.5), the Z-direction component force increases.

If the width in the X-direction of the recess 81' of the X-direction permanent magnet MX1 is narrower than the width in the X-direction of the Y-direction (longitudinal direction) coil-winding portion of the X-drive coil CX, the above-described effects cannot be achieved.

The above-described limitations and effects are also the same for the Y-direction magnets MYA1 and MYB1.

According to the second embodiment, since the magnetic flux densities of the X-direction permanent magnets MX1, Y-direction magnets MYA1 and MYB1 of the front fixed yoke 62 and the magnetic flux densities of the X-direction permanent magnets MX1, Y-direction magnets MYA1 and MYB1 of rear fixed yoke 63 are low at each central portion (recess 81'), and are high at either end (wall portions 82) in the X-direction permanent magnets MX1 in the X-direction and at either end (wall portions 82) in the Y-direction magnets MYA1 and MYB1 in the Y-direction, fluctuation of thrust in the X-direction and in the Y-direction upon the movable stage 61 being moved in the X-direction and in the Y-direction is minimal. Moreover, in the second embodiment, since the longitudinal portions of each of the X-drive coils CX and the Y-drive coils CYA and CYB of the movable stage 61 interpose opposite poles (North and South) of the X-direction permanent magnets MX1, Y-direction magnets MYA1 and MYB1, which are provided on either side of the movable stage 61, it is possible to generate magnetic field lines in a direction substantially orthogonal to the optical axis (O) direction (Z-axis); accordingly, the fluctuations in the thrust generated between the X-direction permanent magnets MX1 and the X-drive coils CX, the thrust generated between the Y-direction magnets MYA1 and MYB1 and the Y-drive coils CYA and CYB are small. Therefore, it is possible to accurately drive the movable stage 61 in the X-direction and in the Y-direction, and since the Z-direction component forces of the thrust in the X-direction and the thrust in the Y-direction are extremely small, the position of the movable stage 61 in the Z-direction can be accurately supported (held), and the movable stage 61 can be accurately driven in the Z-direction.

In the second embodiment, since the X-direction permanent magnets MX1 and MX1, the Y-direction magnets MYA1 and MYA1, and the Y-direction magnets MYB1 and MYB1 are respectively arranged to face each other, a high magnetic density can be obtained even if the thicknesses of the X-direction permanent magnets MX1 and MX1, the I-direction magnets MYA1 and MYA1, and the Y-direction magnets MYB1 and MYB1 are smaller than the X-direction permanent magnets MX, and the Y-direction magnets MYA and MYB of the first embodiment.

In the above-described first and second embodiments, a pair of X-drive coils CX having the same specifications are provided on the movable stage 61 at the left and right sides of the image sensor 31, and a pair of X-direction permanent magnets MX or a pair of X-direction permanent magnets MX1 having the same specifications are provided on the movable stage 61 at the left and right sides of the image sensor 31; however, a X-drive coil CX and an X-direction permanent magnet MX or MX1 can be only provided at either the left or right side of the image sensor 31. Furthermore, a X-direction Hall element HX may be provided only at either the left or right side of the movable stage 61 (at an approximate center of a corresponding X-direction permanent magnet MX or MX1).

In the above-described first and second embodiments, the X-drive coils CX and Y-drive coils CYA and CYB are provided on the movable stage (movable member) 61, and the X-direction permanent magnets MX/MX1 and the Y-direction magnets MYA/MYA1 and MYB/MYB1 are provided on the front fixed yoke (fixed base member) 62 or on both the front and rear fixed yokes (fixed base members) 62 and 63; however, it is possible for the X-drive coils CX and Y-drive coils CYA and CYB to be provided on the front fixed yoke (fixed base member) 62 or on both the front and rear fixed yokes (fixed base members) 62 and 63, and the corresponding X-direction permanent magnets MX/MX1 and the Y-direction magnets MYA/MYA1 and MYB/MYB1 to be provided on a corresponding side or sides of the movable stage (movable member) 61.

In the above-described first and second embodiments, the movable member (movable stage 61) can be driven with 6 degrees of freedom (6DoF). However, it is possible to apply the present invention to a driving device in which a movable member is moved in the X-Y plane only, or to a driving device in which a movable member moves linearly only in the X-direction or the Y-direction.

In the above-described first and second embodiments, the recesses 81 or 81' of each magnet are longitudinally extending grooves, however, the present invention is not limited thereto; the recesses may be box-shaped in form, in which the entire periphery of the magnet is enclosed by wall portions, so that the height of each of the four sides thereof is higher than the central portion. According to such a configuration, the strength of the magnet can be increased.

Figure 11A:
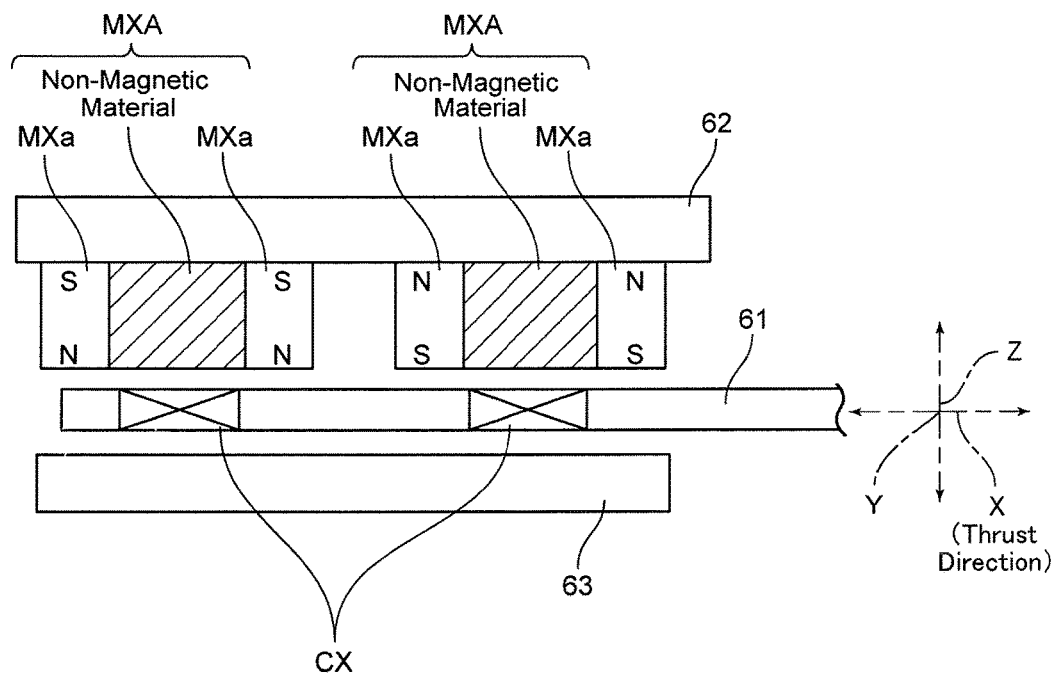
FIG. 11A is a cross-sectional view, similar to those of FIGS. 3 and 9, showing an X-direction thrust generator, to which a magnet of another embodiment is applied.
Figure 11B:
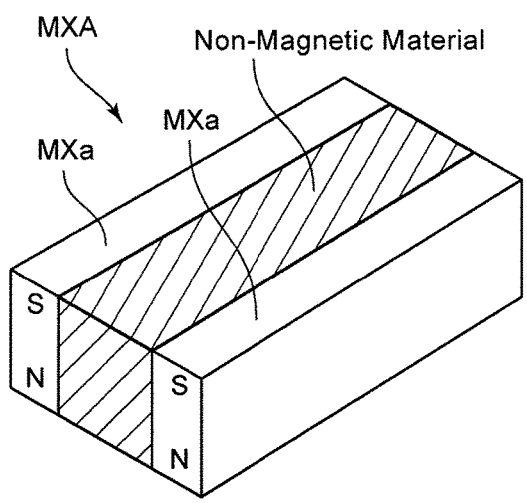
FIG. 11B is a perspective view of the magnet shown in FIG. 11A.
Figure 13:
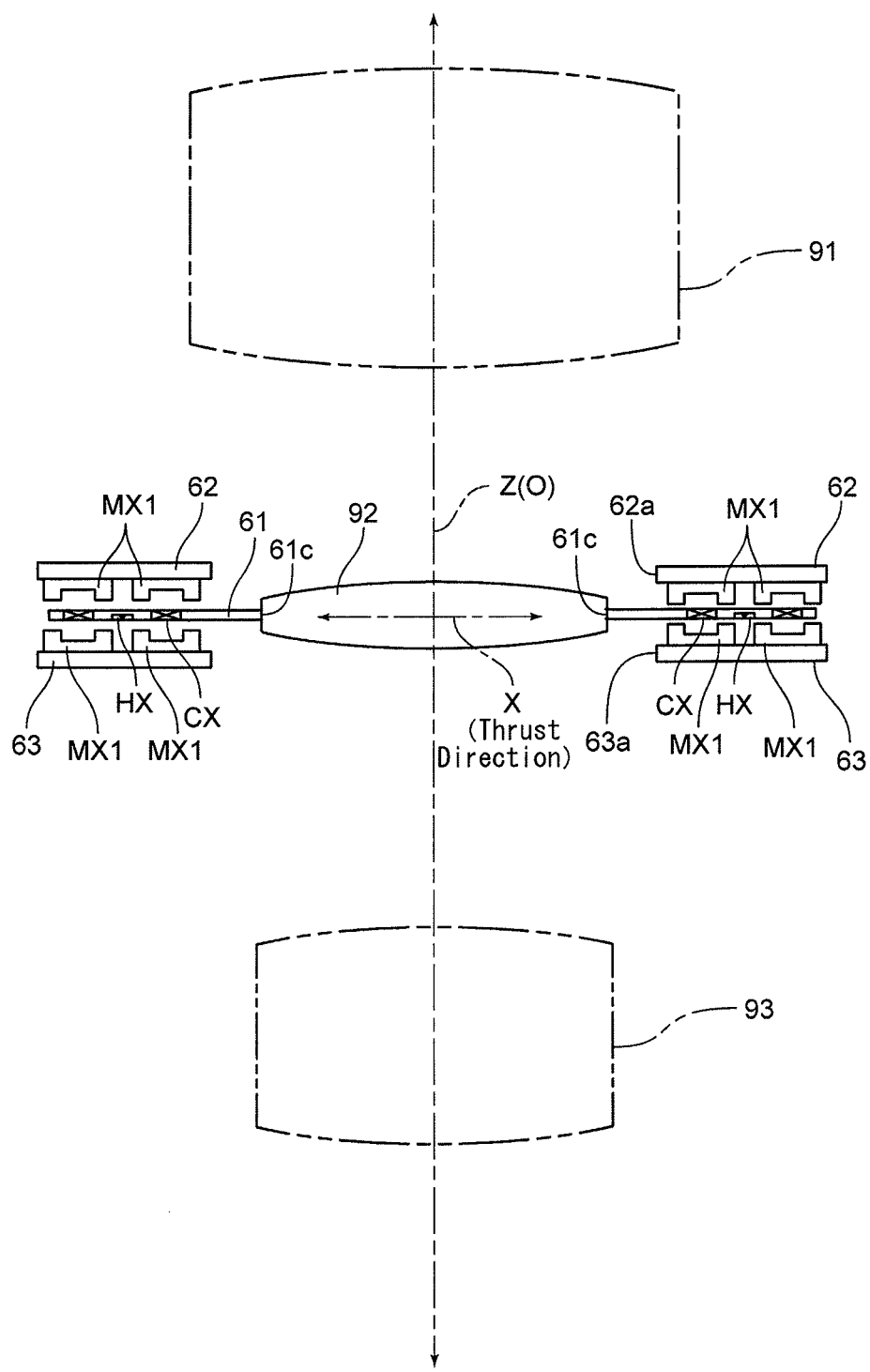
FIG. 13 is a cross-sectional view, corresponding to FIG. 2B, showing another embodiment of a stage apparatus, according to the present invention, applied to a shake correction device of a photographic lens.

In the above-described first and second embodiments, each magnet (X-direction permanent magnets MX/MX1 and the Y-direction magnets MYA/MYA1 and MYB/MYB1) are each shown/described as single members, however, the present invention is not limited thereto; these magnets can be formed from a plurality of materials and/or members. FIGS. 11A and 11B show another example of a X-direction permanent magnet which has a different configuration to that of the X-direction permanent magnets MX/MX1. FIG. 11A corresponds to FIGS. 3 and 9 of the first and second embodiments, respectively. FIG. 11B is a perspective view of the alternative X-direction permanent magnet. In FIGS. 11A and 11B, members and member with functions that are the same as those in the first and second embodiments are designated with the same designators, and duplicate descriptions thereof are omitted.

As shown in FIGS. 11A and 11B, each X-direction permanent magnet MXA is provided with two magnets MXa and MXa, with a non-magnetic material provided therebetween. The magnets MXa and MXa of each X-direction permanent magnet MXA have the same magnetic pole at the sides thereof that face the associated X-drive coils CX. However, the magnetic poles (of the magnets MXa and MXa) of the left X-direction permanent magnet MXA are different to those of the right X-direction permanent magnet MXA at the sides thereof that face the associated X-drive coils CX. By providing a non-magnetic material between the magnets MXa and MXa, the magnetic flux density characteristics and the magnetic flux density distribution shown in FIGS. 5 and 7A through 7C can be obtained.

A known means such as adhesive, etc., can be used to integrate (attach) the magnets MXa and MXa to the non-magnetic material. In the present embodiment, since the magnetic flux density characteristics can be determined by the dimensions of the two magnets MXa and MXa, a single non-magnetic material and the magnetizing power of each magnet MXa, desired magnetic flux density characteristics can be easily obtained.

In the present embodiment, since two magnets MXa and MXa, and a single non-magnetic material can be manufactured as a single set, stable manufacture thereof can be achieved at a reduced manufacturing cost.

The above-described configuration has been applied to the X-direction permanent magnets MXA, however, the same configuration can be applied to the Y-direction magnets (corresponding to the Y-direction magnets MYA and MYB).

The above-described embodiments describe one example in which the present invention is applied to the stage apparatus 60 which drives the movable stage 61, on which the image sensor 31 is mounted. However, the stage apparatus of the present invention can also be applied to a correction optical system in which the stage apparatus drives an optical element of a photographing optical system. FIGS. 12A and 12B are exploded rear and front perspective views of an embodiment of the stage apparatus, of the present invention, applied to a correction optical system. Note that in FIGS. 12A and 12B, the left side designates the object side and front of the correction optical system, and the right side designates the image side and rear of the correction optical system.

The correction optical system is provided with a movable lens frame 102, in which a lens group that constitutes a correction optical system is fixed, and a fixed lens frame 103 which supports the movable lens frame 102 and linearly guides the movable lens frame 102 in the X-direction and the Y-direction, orthogonal to the optical axis O. The movable lens frame 102 corresponds to the movable member (movable stage), and the fixed lens frame 103 corresponds to the base member (fixed yoke). The fixed lens frame 103 is fixed (stationary) relative to a stationary barrel of the photographing optical system.

As viewed from the front, the movable lens frame 102 includes a cylindrical lens-holding portion 111 centered about the optical axis O, and an outer flange 113 which surrounds the out periphery of the lens-holding portion 111 and extends outwardly therefrom in a direction orthogonal to the optical axis O. The outer flange 113 is provided with an X-drive coil CXL and a Y-drive coil CYL which are arranged in an L shape. The movable lens frame 102 is provided with a pair of X-direction guide portions 115 on a rear surface of the outer flange 113; the pair of X-direction guide portions 115 project rearwardly from the outer flange 113 at positions apart from each other in the X-direction.

The fixed lens frame 103 is provided with a cylindrical portion 120, and an inner flange 123 provided at the rear end of the cylindrical portion 120 and having an optical-path aperture 121 centered about the optical axis O. A pair of X-direction permanent magnets MXL and a pair of Y-direction magnets MYL are provided on the front side of the inner flange 123 via a yoke 124 and respectively face the X-drive coil CXL and the Y-drive coil CYL. Although not shown in the drawings, the pair of X-direction permanent magnets MXL and the pair of Y-direction magnets MYL have the same structure as that of the X-direction permanent magnets MXA shown in FIGS. 11A and 11B and are arranged so as not to have a gap therebetween (are in contact the each other). A pair of Y-direction guide portions 125 are provided on the front surface of the inner flange 123 of the fixed lens frame 103; the pair of Y-direction guide portions 125 project forwardly from the inner flange 123 at positions apart from each other in the Y-direction.

The movable lens frame 102 and the fixed lens frame 103 are connected to each other via an L-shaped guide rod 131 so that the movable lens frame 102 can be guided (moved) relative to the fixed lens frame 103 in the X-direction and in the Y-direction. More specifically, an X-direction rod 131X of the L-shaped guide rod 131 is slidably guided (moved) in the X-direction by the pair of X-direction guide portions 115 of the movable lens frame 102, and a Y-direction rod 131Y of the L-shaped guide rod 131 is slidably guided (moved) in the Y-direction by the pair of Y-direction guide portions 125 of the fixed lens frame 103. Hence, the movable lens frame 102 moves in the X-direction via the X-direction rod 131X of the L-shaped guide rod 131 being guided by the X-direction guide portions 115, and moves in the Y-direction integrally with the L-shaped guide rod 131 via the Y-direction rod 131Y of the L-shaped guide rod 131 being guided by the Y-direction guide portions 125 of the fixed lens frame 103.

The movable lens frame 102 is restricted from tilting or rotating about the axes of the X-direction rod 131X and the Y-direction rod 131Y, and the movable lens frame 102 is guided by guide members (not shown in the drawings) such as balls and a ball retainers to move in the X-direction and in the Y-direction. The fixed lens frame 103 is provided with a X-direction and Y-direction positional detector (not shown in the drawings) configured to detect the X-direction position and the Y-direction position of the movable lens frame 102.

With the movable lens frame 102 and the fixed lens frame 103 in a connected state via the L-shaped guide rod 131, the X-drive coil CXL and the X-direction permanent magnet MXL face each other with a predetermined distance therebetween in the optical axis direction, and the Y-drive coil CYL and the Y-direction magnet MYL face each other with a predetermined distance therebetween in the optical axis direction.

By controlling the passage of electric current through the X-drive coil CXL and the Y-drive coil CYL, a thrust force between the X-drive coil CXL and the X-direction permanent magnets MXL can be generated to move the movable lens frame 102 in the X-direction and a thrust force between the Y-drive coil CYL and the Y-direction permanent magnets MYL can be generated to move the movable lens frame 102 in the Y-direction.

The magnetic flux densities of the pair of X-direction permanent magnets MXL and the pair of Y-direction permanent magnets MYL toward the X-drive coil CXL and the Y-drive coil CYL, respectively, are not uniform, but change in the thrust directions along the X-direction and the Y-direction. A central portion, with respect to the X-direction, of each X-direction permanent magnet MXL has the lowest magnetic flux density, and the portions at either end (with respect to the X-direction) of each X-direction permanent magnet MXL has the highest magnetic flux density. Similarly, a central portion, with respect to the Y-direction, of each Y-direction permanent magnet MYL has the lowest magnetic flux density, and the portions at either end (with respect to the Y-direction) of each Y-direction permanent magnet MYL has the highest magnetic flux density. Due to such a magnetic flux density distribution, when the movable lens frame 102 is driven, almost no thrust component force that is non-parallel to the X-Y plane occurs, so that stable thrusts in the X-direction and in the Y-direction can be generated regardless of the position in the X-direction and Y-direction to which the movable lens frame 102 is moved. Accordingly, in this embodiment, the movable lens frame 102 can be accurately moved with high precision without chatter vibration or noise occurring, and in which tilting relative to a plane that is orthogonal to the optical axis O does not easily occur.

In embodiment of FIG. 12, the surfaces of the X-direction permanent magnets MXL and the Y-direction permanent magnets MYL that face the X-drive coil CXL and the Y-drive coil CYL, respectively, are flat surfaces. However, the X-direction permanent magnets MXL and the Y-direction permanent magnets MYL may each have a recessed cross-sectional shape having a recess in the central portion thereof, as shown in FIGS. 2 and 3. Namely, it is desirable for the magnetic flux densities or magnetic forces toward the X-drive coil CXL and the Y-drive coil CYL to have a changing distribution so that the central portion is relatively weak and either end of the distribution is relatively strong. Note that the magnetic flux density distribution and the magnetizing force distribution for the present embodiment are not limited to those shown in FIG. 5 and FIGS. 7A through 7C.

Although in the present embodiment the X-direction permanent magnets MXL and the Y-direction permanent magnets MYL are only provided on one side (the bottom side and right side, respectively) of the fixed lens frame 103 with respect to the optical axis, and the corresponding X-drive coil CXL and the Y-drive coil CYL are only provided on one side (the bottom side and right side, respectively) of the movable lens frame 102, the X-direction permanent magnets MXL and the Y-direction permanent magnets MYL can be provided on both sides of the fixed lens frame 103, respectively, with respect to the optical axis O, and the corresponding X-drive coil CXL and the Y-drive coil CYL can be provided on both sides of the movable lens frame 102, respectively, with respect to the optical axis O. Furthermore, the X-direction permanent magnets MXL and the Y-direction permanent magnets MYL may be provided on the movable lens frame 102, and the X-drive coil CXL and the Y-drive coil CYL may be provided on the fixed lens frame 103.

In the above-described embodiment, which is applied to a photographic lens, a movable member (movable stage 61/movable lens frame 102) is driven in the X-direction and in the Y-direction within a plane (X-Y plane) that is orthogonal to the optical axis, however, the stage apparatus of the present invention can also be applied to a lens barrel that can also drive an optical element (correction optical element) of a photographing optical system in the Z-direction. The stage apparatus of the present invention can also be applied to a lens barrel provided with an image-correction optical system in which one optical element of a photographing optical system is driven. For example, in the photographic lens 101, one or a plurality of optical elements of the photographing optical system can serve as a correction optical element (driven member). In this alternative embodiment shown in FIG. 13, a lens element (driven member) serving as a correction optical element 92 is provided between a first lens group 91 and a second lens group 93. The correction optical element 92 is mounted in an opening 61c formed in the approximate center of the movable stage 61. According to the present embodiment, hand-shake correction (image stabilization) and a special photographic effect such as swing-and-tilt photography by translating the movable stage 61 (correction optical element 92) in the Z-direction (optical axis O direction/first direction), the X-direction (second direction) and/or the Y-direction (third direction), and/or turning (rotating) the movable stage 61 (correction optical element 92) about the Z-direction (first direction), and/or tilting (rotating) the movable stage 61 (correction optical element 92) about the X-direction (second direction) and/or Y-direction (third direction). Furthermore, in the present embodiment, it is possible to carrying out a fine focusing adjustment by finely translating the movable stage 61 (correction optical element 92) in the Z-direction (optical axis O direction/first direction).

The stage apparatus according to the present invention can be applied to various photographing apparatuses and optical apparatuses such as an interchangeable lens and a camera-integrated lens, in addition to a so-called mirrorless digital camera, an SLR (single lens reflex) digital camera, a compact digital camera, a digital video camera, drive recorder, action camera, a digital camera installed in a portable terminal (mobile phone, smartphone), etc.

Furthermore, the present invention can also be applied to a projector (image projector apparatus) which projects images (still/moving images) and data, etc., or a laser scanner. In the case where the present invention is applied to a projector, the projector can be provided at an approximate center of the movable stage 61 with an image-forming element (LCD panel) which allows projection light to be incident thereon from one side (the rear) of the LCD panel in the thickness direction of the movable stage 61 (the first direction/the Z-direction) and to emerge from the LCD panel to travel toward an projector optical system provided on the other side (the front) of the movable stage, or the projector can be provided at an approximate center of the movable stage 61 with a DMD (digital mirror device/digital micro mirror device) panel (projection panel) which reflects the incident projection light, which is incident thereon from a direction different from the first direction (the Z-direction), in the first direction (toward the projector optical system). Alternatively, a projector optical system can be mounted on the movable stage 61 instead of the image-forming element.

Figure 14:
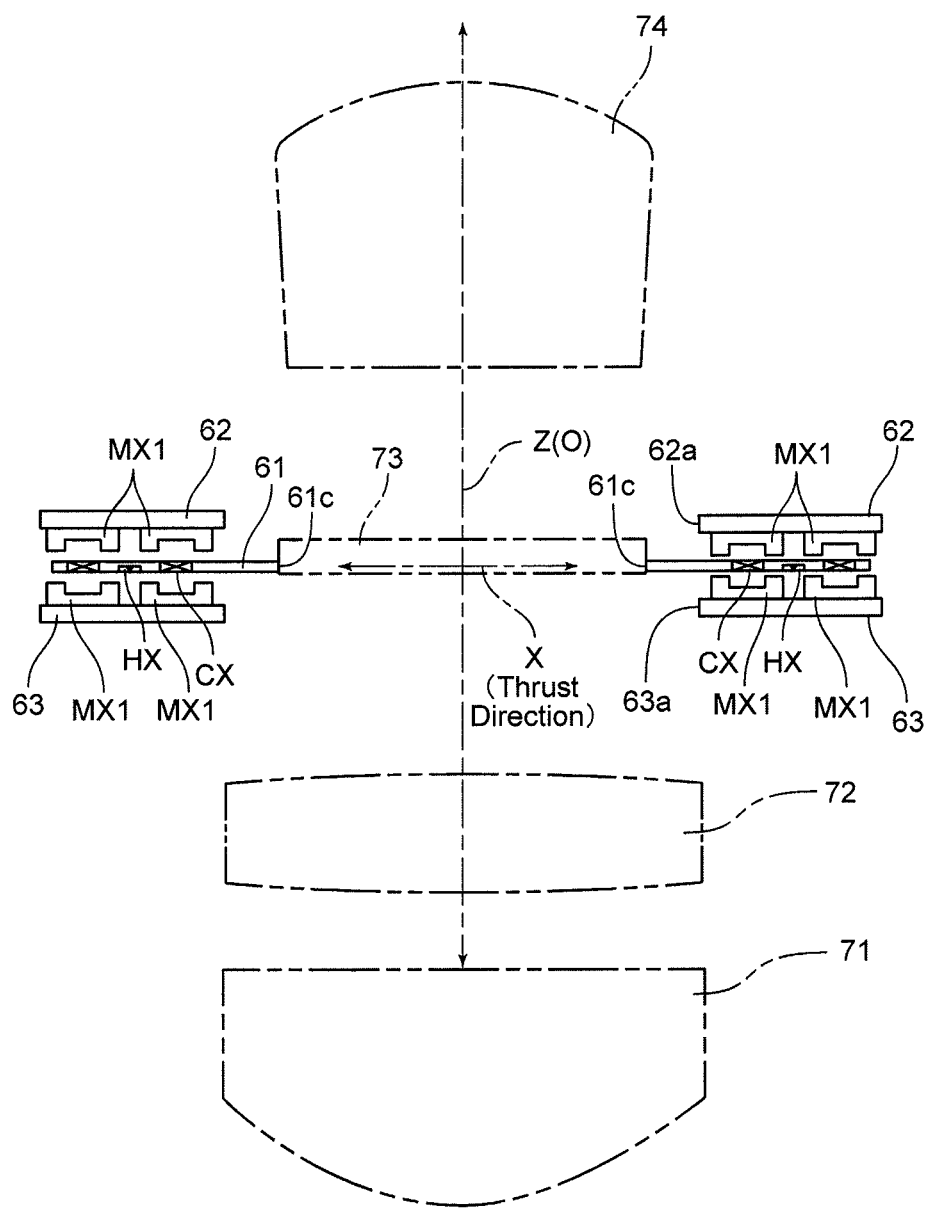
FIG. 14 is a cross-sectional view, corresponding to FIG. 8B, showing another embodiment of a stage apparatus, according to the present invention, applied to an image projector apparatus.

FIG. 14 shows an embodiment of an image projector apparatus (projector) equipped with the stage apparatus 60 provided with the movable stage 61. The image projector apparatus is provided with a light source 71, an illumination optical system 72 which enables a uniform distribution of light emitted from the light source 71, an image-forming element 73 which forms an image upon receiving illumination light which emerges from the illumination optical system. 72, the movable stage 61 on which the image-forming element 73 is mounted in an opening 61c, and a projector optical system 74, which projects the image formed by the image-forming element 73. Specific examples of the image-forming element 73 are an LCD panel or a DMD panel. The image-forming element 73 is installed onto a housing of the projector or the projector optical system 74 via the movable stage 61. The image-forming element 73 is positioned inside the projector so that a plane on which the image formed by the image-forming element 73 is formed is orthogonal to the optical axis O of the projector optical system 74 or the optical axis of any one of the lens elements of the projector optical system 74 in a state where the movable stage 61 is not driven (when the movable stage 61 is held at the initial position). The projecting direction and the projection position can be adjusted by changing the direction of the projection light which travels toward the projector optical system 74 after passing through the LCD panel or changing the direction of the projection light which is reflected by the DMD panel to travel toward the projector optical system 74, or adjusting the orientation of the projection image by translating the movable stage 61 in the Z-direction (optical axis O direction/first direction), X-direction (second direction) and/or the Y-direction (third direction) and/or rotating (turning) the movable stage 61 about the Z-direction (first direction) and/or rotating (tilting) the movable stage 61 about the X-direction (second direction) and/or the Y-direction (third direction), and the focus state can be adjusted by adjusting the distance between the projector optical system 74 and the LCD panel or the DMD panel.

Note that the projector may be provided with a focal detector for detecting a focal shift amount and/or a, e.g., a trapezoidal distortion detector for detecting trapezoidal distortion in the projected image; these detectors are used when focusing and when correcting trapezoidal distortion. In regard to trapezoidal distortion in particular, by providing a trapezoidal distortion detector, a trapezoidal distortion amount can be detected and automatically corrected by rotating the imaging plane with an image plane rotating device based on a focal shift amount.

Furthermore, the projector of the present embodiment can also be applied to digital signage technology. Specifically, the projector of the present embodiment can be utilized for shake correction in the case where the projector is installed in transportation such as inside a train or an automobile. Alternatively, the projector of the present embodiment can be utilized for shake correction in the case where the projector is installed in a movable robot. Furthermore, by installing the shake-correction device of the present invention in a hand-held miniature projector, hand-shake can be effectively corrected. It should be noted that the projector of the present embodiment can be generally installed in a photographing apparatus. In the case where a miniature projector is installed onto a photographing apparatus body, or a display thereof, photographing shake-correction may be carried out, during a photographing operation, by translating and/or rotating (tilting/turning) a movable stage that holds an image sensor or an optical element (lens group, etc.) of a photographing optical system; and a shake-correction may be carried out, during a projecting operation of a photographing image, by translating and/or rotating (tilting/turning) a movable stage that holds an image-forming element so that the projected image does not shake. In the case where the shake-correction device of the present invention is installed a projector, although it is possible to achieve a higher resolution by a pixel shifting method in which the number of pixels that are displayed are increased by shifting the image-forming element by a half pixel or by one pixel, it is also possible to achieve a higher resolution by rotating the movable stage on which the image-forming element is mounted instead of, or in addition to, performing a pixel shifting method.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
   a movable frame configured to move in a direction parallel to a predetermined plane;
   a base configured to support said movable frame to move relative to said base; and
   a thrust generator including:
      a magnet provided on one of said movable frame and said base, and
      a coil provided on the other of said movable frame and said base,
   said magnet and said coil generating a thrust to move said movable frame in a direction parallel to said predetermined plane,
   wherein a magnetic flux density of said magnet becomes lower at the center of said magnet than at the peripheral edges of said magnet.

2. The stage apparatus according to claim 1, wherein said movable frame and said base are each single members,
   wherein said magnet is provided on one of said movable frame and said base, and
   wherein said coil is provided on the other of said movable frame and said base at a position facing said magnet.

3. The stage apparatus according to claim 1, wherein a pair of said bases are provided which face each other, at either side of said movable frame, in a direction that is orthogonal to said predetermined plane,
   wherein said magnets are respectively provided on said pair of said bases at positions, at either side of said movable frame, so that said magnets face each other, and
   wherein said coil is provided on said movable frame in between said magnets that face each other.

4. The stage apparatus according to claim 2, wherein said magnet has a recessed cross-sectional shape so that a thickness thereof in a direction that is orthogonal to said predetermined plane is relatively thick at either end of said magnet, with respect to said thrust direction, and a thickness thereof in the direction that is orthogonal to said predetermined plane is relatively thin at a central portion of said magnet, with respect to said thrust direction.

5. The stage apparatus according to claim 4, wherein a depth of a recess of said recessed cross-sectional shape of said magnet is ⅗ through ⅘ of the overall thickness of said magnet in said direction that is orthogonal to said predetermined plane.

6. The stage apparatus according to claim 2, wherein a magnetic flux density ratio at the central portion of said magnet is 15% through 30% less than that at either end of said magnet with respect to the thrust direction.

7. The stage apparatus according to claim 2, wherein a magnetizing force ratio at the central portion of said magnet is 15% through 30% less than that at either end of said magnet with respect to the thrust direction.

8. The stage apparatus according to claim 3, wherein each of said magnets has a recessed cross-sectional shape so that a thickness thereof in a direction that is orthogonal to said predetermined plane is relatively thick at either end of said magnet, with respect to said thrust direction, and a thickness thereof in the direction that is orthogonal to said predetermined plane is relatively thin at a central portion of said magnet, with respect to said thrust direction,
   wherein a depth of a recess of said recessed cross-sectional shape of said magnet is ¼ through ½ of the overall thickness of said magnet in said direction that is orthogonal to said predetermined plane.

9. The stage apparatus according to claim 3, wherein a magnetic flux density ratio at the central portion of said magnet is 20% through 50% less than that at either end of said magnet with respect to the thrust direction.

10. The stage apparatus according to claim 3, wherein a magnetizing force ratio at the central portion of said magnet is 20% through 50% less than that at either end of said magnet with respect to the thrust direction.

11. The stage apparatus according to claim 1, wherein a magnetizing force of said magnet is distributed in a concave form so that the magnetizing force is higher at either end of said magnet than the central portion of said magnet, with respect to the thrust direction.

12. The stage apparatus according to claim 1, wherein a magnetizing force of said magnet is distributed in a substantial trapezoidal form so that the magnetizing force is higher at either end of said magnet than the central portion of said magnet, with respect to the thrust direction.

13. The stage apparatus according to claim 1, wherein a magnetizing force of said magnet is distributed in a substantial rectangular form so that the magnetizing force is higher at either end of said magnet than the central portion of said magnet, with respect to the thrust direction.

14. The stage apparatus according to claim 1, wherein said magnet comprises:
   a non-magnetic material in a central portion thereof, with respect to the trust direction; and
   a pair of magnets on either side of said non-magnetic material.

15. The stage apparatus according to claim 1, wherein an image sensor is provided on said movable frame.

16. The stage apparatus according to claim 1, wherein an optical member is provided on said movable frame, said optical member constituting part of a photographing optical system.

17. A photographing apparatus provided with the stage apparatus according to claim 1, wherein an image sensor is provided on said movable frame of said stage apparatus.

18. An optical instrument provided with the stage apparatus according to claim 1, wherein an optical member is provided on said movable frame of said stage apparatus, said optical member constituting part of a photographing optical system.

19. A stage apparatus for an image projector apparatus, comprising:
   a movable frame configured to move in a direction parallel to a predetermined plane, said movable frame provided with one of an image-forming element which forms an image and a projector optical system that is configured to project an image formed by an image-forming element;
   a base configured to support said movable frame to move relative to said base; and
   a thrust generator including:
      a magnet provided on one said movable frame and said base, and
      a coil provided on the other of said movable frame and said base,
   said magnet and said coil generating a thrust to move said movable frame in a direction parallel to said predetermined plane, wherein a magnetic flux density of said magnet becomes lower at the center of said magnet than at the peripheral edges of said magnet.

* * * * *